US008038887B2

(12) United States Patent
Bakajin et al.

(10) Patent No.: US 8,038,887 B2
(45) Date of Patent: Oct. 18, 2011

(54) MEMBRANES FOR NANOMETER-SCALE MASS FAST TRANSPORT

(75) Inventors: Olgica Bakajin, San Leandro, CA (US);
Jason Holt, Berkeley, CA (US);
Aleksandr Noy, Belmont, CA (US);
Hyung Gyu Park, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 613 days.

(21) Appl. No.: 12/064,604

(22) PCT Filed: Aug. 23, 2006

(86) PCT No.: PCT/US2006/033180
§ 371 (c)(1),
(2), (4) Date: Apr. 16, 2008

(87) PCT Pub. No.: WO2007/025104
PCT Pub. Date: Mar. 1, 2007

(65) Prior Publication Data
US 2008/0223795 A1    Sep. 18, 2008

Related U.S. Application Data

(60) Provisional application No. 60/711,436, filed on Aug. 24, 2005.

(51) Int. Cl.
B01D 61/00    (2006.01)
B01D 39/00    (2006.01)
B01D 29/00    (2006.01)
B01C 65/00    (2006.01)
(52) U.S. Cl. ............... 210/652; 210/500.27; 210/500.25; 210/502.1; 210/490; 264/41; 264/555; 977/751; 428/304.4; 423/447.23; 427/291

(58) Field of Classification Search ............. 210/500.27, 210/500.41, 502.1, 490, 767, 652; 264/41, 264/555; 428/304.4, 36.9, 408; 423/447.23, 423/477.1; 977/752, 745, 746, 778, 788
See application file for complete search history.

(56) References Cited

U.S. PATENT DOCUMENTS
4,302,336 A    11/1981    Kawaguchi et al.
(Continued)

FOREIGN PATENT DOCUMENTS
EP    1 340 544 A1    9/2003
(Continued)

OTHER PUBLICATIONS
Acharya and Foley (2000) "Transport in Nanoporous Carbon Membranes: Experiments and Analysis," AIChe J. 46:911.
(Continued)

*Primary Examiner* — Ana Fortuna

(57) ABSTRACT

Nanoporous membranes comprising single walled, double walled, and multiwalled carbon nanotubes embedded in a matrix material were fabricated for fluid mechanics and mass transfer studies on the nanometer scale and commercial applications. Average pore size can be 2 nm to 20 nm, or seven nm or less, or two nanometers or less. The membrane can be free of large voids spanning the membrane such that transport of material such as gas or liquid occurs exclusively through the tubes. Fast fluid, vapor, and liquid transport are observed. Versatile micromachining methods can be used for membrane fabrication. A single chip can comprise multiple membranes. These membranes are a robust platform for the study of confined molecular transport, with applications in liquid and gas separations and chemical sensing including desalination, dialysis, and fabric formation.

13 Claims, 10 Drawing Sheets

U.S. PATENT DOCUMENTS

| | | | |
|---|---|---|---|
| 4,434,057 A | | 2/1984 | Marquardt |
| 5,051,178 A | | 9/1991 | Uemura et al. |
| 5,102,550 A | | 4/1992 | Pizzino et al. |
| 5,376,253 A | | 12/1994 | Rychen et al. |
| 5,698,175 A | * | 12/1997 | Hiura et al. ............... 423/447.1 |
| 6,824,689 B2 | * | 11/2004 | Wang et al. .................. 210/660 |
| 6,858,197 B1 | * | 2/2005 | Delzeit ...................... 423/447.3 |
| 6,863,942 B2 | * | 3/2005 | Ren et al. ..................... 428/36.9 |
| 7,205,069 B2 | * | 4/2007 | Smalley et al. ............... 429/129 |
| 7,229,556 B1 | | 6/2007 | Hinds, III et al. |
| 7,413,723 B2 | * | 8/2008 | Niu et al. ................... 423/447.3 |
| 7,439,731 B2 | * | 10/2008 | Crafts et al. ............... 324/158.1 |
| 7,459,121 B2 | * | 12/2008 | Liang et al. .................... 264/555 |
| 7,473,411 B2 | * | 1/2009 | Ajayan et al. .............. 423/447.1 |
| 7,611,628 B1 | | 11/2009 | Hinds, III |
| 7,623,340 B1 | * | 11/2009 | Song et al. .................... 361/502 |
| 2003/0116503 A1 | | 6/2003 | Wang et al. |
| 2003/0165418 A1 | * | 9/2003 | Ajayan et al. .............. 423/447.2 |
| 2004/0173506 A1 | * | 9/2004 | Doktycz et al. ................. 210/85 |
| 2005/0079379 A1 | | 4/2005 | Wadsworth et al. |
| 2006/0073089 A1 | | 4/2006 | Ajayan et al. |
| 2009/0321355 A1 | | 12/2009 | Ratto et al. |
| 2010/0025330 A1 | * | 2/2010 | Ratto et al. .................... 210/651 |

FOREIGN PATENT DOCUMENTS

| | | |
|---|---|---|
| GB | 2 399 092 A | 9/2004 |
| WO | WO 2005/001021 A | 1/2005 |

OTHER PUBLICATIONS

Ackerman et al. (2003) "Diffusivities of Ar and Ne in Carbon Nanotubes," Mol. Sim. 29:677-684.

Agre et al., (2001) "Discovery of the Aquaporins and Their Impact on Basic and Clinical Physiology," Curr. Top. Membr. 51:1-38.

Baudry, et al. (2001) "Experimental Evidence for a Large Slip Effect at a Nonwetting Fluid-Solid Interface," Langmuir 17:5232-5236.

Bhatia et al. (2005) "Comparisons of diffusive and viscous contributions to transport coefficients of light gases in single-walled carbon nanotubes," Mol. Sim. 31:643-649.

Bird et al. (1960) "§ 1.4 Theory of Viscosity of Gases at Low Density," Transport Phenomena Wiley, Ed. (New York), pp. 19-26.

Bittner et al. (2003) "Characterization of the surfaces of single-walled carbon nanotubes using alcohols and hydrocarbons: a pulse adsorption technique," Carbon 41:1231-1239.

Cervera et al. (2001) "Ion size effects on the current efficiency of narrow charged pores," J. Membrane Sci. 191:179-187.

Chen and Sholl (2006) "Predictions of selectivity and flux for $CH_4/H_2$ separations using single walled carbon nanotubes as membranes," J. Memb. Sci. 269:152-160.

Chen et al. (2006) "Transport Diffusion of Gases is Rapid in Flexible Carbon Nanotubes," J. of Phys. Chem. B 110:1971-1975.

Cooper et al. (2004) "Gas Transport Characteristics through a Carbon Nanotube," Nano Lett. 4(2):377-381.

Cottin-Bizonne et al. (2002) "Nanorheology: An investigation of the boundary condition at hydrophobic and hydrophilic interfaces," Eur. Phys. J. E 9:47-53.

Craig et al. (2001) "Shear-Dependent Boundary Slip in an Aqueous Newtonian Liquid," Phys. Rev. Let. 87(5):054504-1.

Cui et al. (2000) "Deposition of aligned bamboo-like carbon nanotubes via microwave plasma enhanced chemical vapor deposition," J. Appl. Phys. 88(10):6072.

Deen (1987) "Hindered Transport of Large Molecules in Liquid-Filled Pores," AIChE J. 33(9):1409-1425.

Elwenspoek et al. (1998) Silicon Micromachining, Cambridge Univ. Press: Cambridge, England, pp. 352-356.

Ganguli et al. (1997) "Improved growth and thermal stability of Parylene films," J. Vac. Sci. Technol. A, 15(6):3138-3142.

Gao et al. (2003) "Spontaneous Insertion of DNA Oligonucleotides into Carbon Nanotubes," Nano Lett. 3(4):471-473.

Harrell et al. (2003) "Synthetic Single-Nanopore and Nanotube Membranes," Anal. Chem. 75:6861-6867.

Hata et al. (2004) "Water-Assisted Highly Efficient Synthesis of Impurity-Free Single-Walled Carbon Nanotubes," Science 306:1362.

Hinds et al. (2004) "Aligned Multiwalled Carbon Nanotube Membranes," Science 303:62-65.

Holt et al. (2004) "Fabrication of a Carbon Nanotube-Embedded Silicon Nitride Membrane for Studies of Nanometer-Scale Mass Transport," Nano Letters 4(11):2245-2250.

Holt et al. (2006) "Fast Mass Transport through Sub-2-Nanometer Carbon Nanotubes," Science 312:1034-1037.

Hou et al. (2002) "Poly($p$-xylylene) Nanotubes by Coating and Removal of Ultrathin Polymer Template Fibers," Macromolecules 35:2429-2431.

Hummer et al. (2001) "Water conduction through the hydrophobic channel of a carbon nanotube," Nature 414:188-190.

Iijima et al. (1996) "Structural flexibility of carbon nanotubes," J. Chem. Phys. 104(5):2089-2092.

Itaya et al. (1984) "Properties of Porous Anodic Aluminum Oxide Films as Membranes," J. Chem. Eng. Jpn. 17(5):514.

Kalra et al. (2003) "Osmotic water transport through carbon nanotube membranes," Proc. Natl Acad. Sci. USA, 100(18):10175-10180.

Koga et al. (2001) "Formation of ordered ice nanotubes inside carbon nanotubes," Nature 412:802-805.

Kolesnikov et al. (2004) "Anomalously Soft Dynamics of Water in a Nanotube: A revelation of Nanoscale Confinement," Phys. Rev. Lett. 93(3):035503.

Kotsalis et al. (2004) "Multiphase water flow inside carbon nanotubes," Int. J. Multiph. Flow 30:995-1010.

Lai et al. (2003) "Microstructural Optimization of a Zeolite Membrane for Organic Vapor Separation," Science 300, 456.

Leger et al. (1996) "Preparation and properties of surface modified ceramic membranes. Part III. Gas permeation of 5 nm alumina membranes modified by trichloro-octadecylsilane," J. Memb. Sci. (120):187-195.

Li et al. (1999) "Highly-ordered carbon nanotube arrays for electronics applications," Appl. Phys Lett. 75(3):367-369.

Lindsay et al. (May 2003) "Test Results of Air-Permeable Charcoal Impregnated Suits to Challenge by Chemical and Biological Warfare Agents and Simulants: Summary Report", U.S. Amy Soldier and Biological Chemical Command Report, ECBC-TR, Aberdeen Proving Ground, MD, Unclassified Report.

Ma et al. (1998) "Processing and properties of carbon nanotubes-nano-SiC ceramic," J. Mater. Sci. 33:5243-5246.

Melechko et al., "Vertically aligned carbon nanofibers and related structures: Controlled synthesis and directed assembly," Applied Physics Reviews, Feb. 3, 2005, vol. 97, p. 041301.

Miller et al. (2001) "Electroosmotic Flow in Template-Prepared Carbon Nanotube Membranes," J. Am. Chem. Soc. 123(49):12335-12342.

Murakami et al. (2004) "Growth of vertically aligned single-walled carbon nanotube films on quartz substrates and their optical anisotropy," Chem. Phys. Lett., 385:298-303.

Naguib et al.(2004) "Observation of Water Confined in Nanometer Channels of Closed Carbon Nanotubes," Nano Lett. 4(11):2237-2243.

Robertson and Wise (1994) "A Nested Electrostatically-Actuated Microvalve for an Integrated Microflow Controller," Proc. IEEE Micro Electro Mechanical Systems 7.

Robertson and Wise (2001) "Modeling a microfluidic system using Knudsen's empirical equation for flow in the transition regime," J. Vac. Sci. Technol. A 19(1):358-364.

Rogojevic et al. (1999) "Modeling vapor deposition of low-$K$ polymers: Parylene and polynaphthalene," J. Vac. Sci. Technol. 17(1):266-274.

Rousseau et al. (2004) "Modeling protonated water networks in bacteriorhodopsin," Phys. Chem. Chem. Phys. 6:1848-1859.

Rutherford and Do (1997) "Review of Time Lag Permeation Technique as a Method for Characterisation of Porous Media and Membranes," Adsorption 3:283-312.

Skoulidas (2002) "Rapid Transport of Gases in Carbon Nanotubes," Phys. Rev. Lett. 89(18):185901-1185901-4.

Sun et al. (2000) "Single Carbon Nanotube Membranes: A Well-Defined Model for Studying Mass Transport through Nanoporous Materials," J. Am. Chem. Soc. 122:12340-12345.

Tong et al. (2004) "Silicon Nitride Nanosieve Membrane," Nano. Lett. 4(2):283-287.

Van Rijn et al. (1995) "Micro filtration Membrane Sieve with Silicon Micro Machining for Industrial and Biomedical Applications," IEEE Conf. MEMBS '95; pp. 83-87.

Van Rijn et al. (1997) "Deflection and Maximum Load of Microfiltration Membrane Sieves Made with Silicon Micromachining," J. Microelectromech. Syst. 6(1):48-54.

Williams et al. (1999) "Separation of Organic Pollutants by Reverse Osmosis and Nanofiltration Membranes: Mathematical Models and Experimental Verification," Ind. Eng. Chem. Res. 38(10):3683-3695.

Yaroshchuk (2001) "Non-steric mechanisms of nanofiltration: superposition of Donnan and dielectric exclusion," Sep. snd Purification Tech. 22-23:143-158.

Yu et al. (2005) "Interphase exchange coupling in Fe/Sm-Co bilayers with gradient Fe thickness," J. Appl. Phys. 98:063908.

Zhu et al. (2002) "Density-Induced Interchange of Anisotropy Axes at Half-Filled High Landau Levels," Phys. Rev. Lett. 88(11):116803.

Roehl et al., "Residual Life Indicators—Point Chemical Detectors Used to Measure the Capacity of Activated Carbon in Protective Garments, Gas Mask Filters and Collective Protection Filters," Scentczar Corporation Report, Fredericksburg, Virginia, Oct. 23-27, 2000, pp. 123-130, Williamsburg, Va.

* cited by examiner

MEMBRANES FOR NANOMETER-SCALE MASS FAST TRANSPORT

CROSS-REFERENCE TO RELATED APPLICATIONS

This application is a national stage application under 35 U.S.C. §371 of International Application No. PCT/US2006/033180, filed Aug. 23, 2006, which in turn claims priority under 35 U.S.C. §119(e) to U.S. provisional application Ser. No. 60/711,436, filed Aug. 24, 2005, the contents of each of which are hereby incorporated by reference in their entireties into the present disclosure.

STATEMENT OF FEDERAL SUPPORT

The United States Government has rights in this invention pursuant to Contract No. W-7405-ENG-48 between the US Department of Energy and the University of California for the operation of Lawrence Livermore National Laboratory.

BACKGROUND

A number of recent studies (see, for example, Sun et al. (2000) J. Am. Chem. Soc. 122:12340-12345; Miller et al. (2001) JACS 123:12335-12342; Harrell et al. (2003) Anal. Chem. 75:6861-6867; Cooper et al. (2004) Nano Lett. 4:377-381; and Hinds et al. (2004) Science 303:62-65) have focused on the development of membranes with nanometer-scale pores. Such membranes could find application in the area of size-based chemical and biological separations, provided pore sizes can be reduced to molecular diameters and a high flux of the permeate molecule can be achieved. On this size scale, however, little is known about the behavior of fluids; deviations from continuum transport can occur as the channel size becomes comparable to molecular diameters. For example, it is known that the intra-pore diffusivity (as compared with the bulk diffusivity) decreases when the pore size becomes comparable to molecular dimensions (see for example, Deen (1987) AIChE J. 33:1409-1425). In electrolyte solutions, if the pore radius is comparable to the Debye length (electrical double layer thickness), a situation can arise where the ion concentration within the pore exceeds that of the bulk solution (see, for example, Cerver et al. (2001) J. Membrane Sci. 191:179-187), which may have some interesting consequences for the development of ion-selective membranes.

Carbon nanotubes, with inner diameters as small as 1 nm, were postulated to provide an ideal system for the study of confined molecular transport. A number of recent molecular dynamics simulations have focused on transport within these materials (see for example Koga et al. (2001) Nature 412:802-805; Hummer et al. (2001) Nature 414:188-190 and Gao et al. (2003) Nano Lett. 3:471-473). Many exotic predictions have been made, from the formation of novel phases of ice (see for example Koga et al. (2001) supra) and pulsed one-dimensional water transport (see for example Hummer et al. (2001) supra), to the spontaneous insertion of ss-DNA into a single wall carbon nanotube (see for example Gao et al. (2003) supra). What has been lacking, however, is an experimental platform for experimental verification of these and other predictions.

One method for fabrication of such a platform involves chemical vapor deposition of carbon within the pores of an alumina membrane (see for example Miller et al. (2001) supra). Typically, the pore sizes achieved by this approach (of order 100 nm) are larger than the size range of interest for chemical and biological separations. In addition, the inner walls of these carbon nanotubules are only semigraphitic and thus do not possess the inherent smoothness of a purely graphitic carbon nanotube (CNT). It is also reported (see Miller et al. (2001) supra) that tubes prepared in this manner possess acidic surface sites (—COOH) on their walls. The inherent smoothness and inertness of a purely graphitic CNT are the attributes that, according to the molecular dynamics simulations (Skoulidas (2002) Phys. Rev. Lett. 89:185901-1-185901-4), give rise to a high molecular flux through CNTs.

Another method for preparation of a nanotube membrane involves embedding an amorphous carbon coated graphitic tube in an epoxy matrix (Sun et al. (2000) supra). However, the resultant pore diameter in these materials is again large (about 150 Nm). A method that has managed to produce membranes in the single nanometer size regime involves creating damage tracks in a polycarbonate film by use of a collimated fission fragment beam, followed by etching in basic solution (Harrell et al. (2003) supra). With subsequent electroless plating, single gold nanotubes of order 2 nm were prepared.

More recently, a polystyrene-coated CNT membrane was fabricated (Hinds et al. (2004) supra). The pore sizes of this membrane are reported to be consistent with that of multiwall CNT inner diameters (about 7.5 nm). However, extremely small carbon nanotubes, that can be fabricated into an array or membrane, were not heretofore reported.

Several simulations of water transport through single walled carbon nanotubes (SWCNTs) have suggested that water not only occupies these channels, but also that fast molecular transport takes place, far in excess of what continuum hydrodynamic theories would predict if applied on this length scale (Hummer et al. (2001) supra and Kalra et al. (2003) Proc. Natl. Acad. Sci. USA, 100, 10175). Molecular dynamics (MD) simulations attribute this enhancement to the atomic smoothness of the nanotube surface and to molecular ordering phenomena that may occur on confined length scale in the 1-2 nm range (Hummer et al. (2001) supra and Kalra et al. (2003) supra). For similar reasons, simulations of gas transport through SWCNTs (Skoulidas et al. (2002) Phys. Rev. Lett. 89, 185901) predicted flux enhancements of several orders of magnitude relative to other similarly-sized, nanoporous materials. Membrane-based gas separations, such as those utilizing zeolites (Lai et al. (2003) Science 300, 456), provided precise separation and size exclusion, although often at the expense of throughput or flux. A SWCNT membrane may offer the highly selective, high flux membrane that, prior to Applicants' disclosure, currently did not exist in the field.

Researchers have recently fabricated multi-walled carbon nanotube (MWCNT) membranes with larger pore diameters (6-7 nm) having vertically aligned arrays of MWCNTs (Hinds et al. (2004) supra) and by templated growth within nanochannel alumina (Li et al. (1999) Appl. Phys Lett. 75:367). Quantifying transport through an individual tube in a MWCNT membrane is difficult, however, as MWCNTs are prone to blockages, in particular by "bamboo" structures and catalyst particles that can migrate to and obstruct the nanotube interior (Cui et al. (2000) J. Appl. Phys. 88, 6072). The consequence of such blockages is a significant reduction of the active membrane pore density. In contrast, there are few, if any, reports of "bamboo" structure formation or catalyst migration for SWCNT or double-wall carbon nanotubes (DWCNTs). However, several groups have reported that it is difficult to produce vertically aligned carbon nanotubes of this size (Hata et al. (2004) Science 306:1362). No admission is made that any reference cited in this section or any other section herein is admitted prior art.

DETAILED DESCRIPTION OF THE INVENTION

Applicants disclose herein that carbon nanotubes offer an important system for studying molecular transport and nanofluidics due to their nanometer size and atomically smooth surfaces. While not limited to this application, water transport through carbon nanotubes is particularly interesting because of the somewhat counterintuitive suggestion that water can occupy such confined hydrophobic channels. Experimental evidence has confirmed that water can occupy these channels (Kolesnikov et al. (2004) Phys. Rev. Lett. 93:035503 and Naguib et al. (2004) Nano Lett. 4:2237). Water transport through molecular-scale hydrophobic channels is also important due to the similarity of this system to transmembrane protein pores such as aquaporins (Agre et al., (2001) Curr. Top. Membr. 51:1-38).

The various embodiments described herein include membranes, articles and devices comprising membranes, and methods of making these membranes, articles, and devices. In one aspect, the membranes surprisingly provide faster than expected and thus efficient liquid and gaseous fluid transport despite nanoscale pore size. Moreover, they are mechanically robust, and they provide a versatile system to commercialize fluid transport for particular applications.

One embodiment provides a membrane for enhanced fluid transport comprising: (i) a vertically-aligned array of carbon nanotubes, wherein the nanotubes have average pore size of about 2 nm or less, and (ii) a matrix material disposed between the carbon nanotubes. Another aspect is the array of vertically aligned carbon nanotubes and the matrix contained on a porous support material such as paper, membrane, polymer or weave.

In one aspect, the vertically-aligned array of carbon nanotubes are contained on a membrane and have an average pore size of about 7 nm or less with a matrix material disposed between the carbon nanotubes, wherein the nanotubes have open ends on each side of the membrane. The membrane can provide enhanced gas transport compared to Knudsen predicted transport for same sized pores.

Another embodiment provides a membrane comprising: carbon nanotubes encapsulated in a matrix, wherein the nanotubes have average pore size of about 7 nm or less, wherein the membrane provides enhanced gas transport relative to Knudsen diffusion.

In another embodiment, provided is a membrane comprising: a vertically-aligned array of nanotube channels comprising gaps between the channels; a ceramic matrix material disposed between the channels.

Also provided is a method of making a membrane comprising: fabricating a vertically-aligned array of carbon nanotubes, wherein the array comprises gaps between the carbon nanotubes, filling gaps between the carbon nanotubes with ceramic matrix material, wherein the carbon nanotubes are open providing flow through the membrane.

Also provided is a method of making a membrane comprising: fabricating a vertically-aligned array of carbon nanotubes, wherein the array comprises gaps between the carbon nanotubes, filling gaps between the carbon nanotubes with polymeric matrix material, wherein the carbon nanotubes are open providing flow through the membrane.

Also provided is a method of making a membrane comprising: fabricating a vertically-aligned array of carbon nanotubes, wherein the array comprises gaps between the carbon nanotubes, filling gaps between the carbon nanotubes with ceramic or polymer matrix material, wherein the carbon nanotubes are open providing enhanced gas flow through the membrane compared to Knudsen diffusion.

Also provided is a method for fabricating nanoporous membranes comprising: growing a vertically aligned carbon nanotube array on a substrate with high aspect ratio gaps between the nanotubes; coating the array with a conformal matrix material capable of conformably filling the high aspect ratio gaps between the nanotubes to immobilize the nanotubes upon hardening of the conformal matrix material; and opening the ends of the nanotubes.

A further embodiment is a method for separating analytes and therefore purifying a fluid or gas by passing the fluid or gas to be purified through at least one carbon nanotube as described herein. In one aspect, the nanotubes are contained within a membrane and the fluid to be purified is water for example from fresh water sources or sea water containing salt. The method may also comprise collecting the liquid or gas after passing through the one or more nanotubes.

Another embodiment is a fabric comprising the membrane having the array of nanotubes and a porous polymer or fiber fabric supporting material.

Articles can include articles that comprise a plurality of membranes including for example chips comprising a plurality of membranes, as well as systems and devices wherein membranes are placed on top of each other in multilayer formats.

Also described herein is a method for producing a CNT-based membrane using low-stress silicon nitride as a conformal matrix material. This method provides a graphitic CNT membrane using a ceramic matrix material. In contrast to polymer matrices, silicon nitride has a negligible molecular permeability, leaving the cores of embedded CNTs as the only pores in the membrane. In addition, the nanotubes can also serve as a template for the production of nanoporous silicon nitride since they can be selectively removed by oxidation. Another advantage of silicon nitride is its vapor phase deposition. Materials deposited in the liquid phase such as spun-on polymers may involve elaborate curing processes to reduce CNT agglomeration and ensure retention of alignment.

Also provided herein is a robust, void-free membrane that can be used for the study and commercialization of nanofluidics which has been prepared by microfabrication techniques; the membrane comprising multiwall carbon nanotubes embedded in a silicon nitride matrix. A nanoporous silicon nitride membrane was formed by the oxidative removal of these carbon nanotubes from the silicon nitride matrix. The gas permeability of this nanoporous silicon nitride membrane was confirmed and the nitrogen permeance determined. Assuming Knudsen-type diffusion through the membrane, an average pore size of 66 nm was calculated, which was comparable to that of the multiwall nanotube outer diameter. The calculated rate of water transport (in the hydrodynamic limit) of 1.91 mol/$m^2$-s through a smaller pore nanotube membrane indicates that the structure would be suitable for liquid-based experiments and nanofluidic devices. Deposition parameters can be controlled to suppress the formation of "bamboo" CNTs, as well as fabrication of an analogous double and single wall nanotube membranes, which allow examination of some of the exotic molecular transport properties for CNTs.

Further described herein are gas and water flow measurements through microfabricated membranes with sub 2 nanometer (inner diameter) aligned carbon nanotubes as pores. The measured gas flow exceeds predictions of the Knudsen diffusion model by more than an order of magnitude. The measured water flow exceeds values calculated from continuum hydrodynamics models by more than three orders of magnitude and is comparable to flow rates extrapolated from molecular dynamics simulations. The gas and water permeabilities of these nanotube-based membranes are several orders of magnitude higher than those of commercial polycarbonate membranes, despite having order of magnitude smaller pore sizes. These membranes enable fundamental studies of mass transport in confined environments, as well as more energy-efficient nanoscale filtration.

BRIEF DESCRIPTION OF THE DRAWINGS

FIG. 7A shows vertically aligned array of SWCNTs and 7B is a Raman spectrum of these SWCNTs, illustrating their high degree of graphitization and internal diameters in the 1-2 nm size range.

FIG. 9A is a schematic of the fabrication process: 1. Microscale pit formation (by KOH etching), 2. Catalyst deposition/annealing, 3. CNT growth, 4. Gap filling with low-pressure chemical vapor deposited $Si_3N_4$, 5. Membrane area definition (by $XeF_2$ isotropic Si etching), 6. Silicon nitride etch to expose CNTs and remove catalyst nanoparticles (by Ar ion milling), the membrane is still impermeable at this step, 7. CNT uncapping (reactive ion etching ("RIE"), the membrane begins to exhibit gas permeability at this step. FIG. 9B is a SEM cross-section of the as-grown double wall CNTs. FIG. 9C is a SEM cross-section of the membrane, illustrating the excellent gap fill by silicon nitride. FIG. 9D is a photograph of the open membrane areas, with the inset showing a close-up of one membrane.

FIGS. 10A through 10E illustrate the nanotubes of this invention. FIG. 10A are TEM images of as-grown CNTs, prepared by removing them from the silicon substrate and dispersing them in dimethylformamide. The majority of the carbon nanotubes are double-walled, as identified in the high-resolution inset. FIG. 10B shows pore size distribution, derived from TEM measurements of the inner diameter of 391 individual carbon nanotubes, revealing an average pore size of 1.6 nm. The average outer diameter of these DWCNTs is estimated to be 2.3 nm. FIG. 10 C is the nanotube membrane showing continuous nitride coating on the scales examined in this image (about 0.2×0.2 μm$^2$). No microcracks or microvoids can be seen. The bright white spots (circled in yellow) revealed in the figure are carbon nanotube pores, which can be identified by the surrounding ring-shape coating of silicon nitride. For clarity, not all visible CNTs were circled. The density of carbon nanotubes is measured to be about $2.5 \times 10^{11}$ cm$^{-2}$ from several similar TEM images. FIGS. 10D and 10E are high resolution TEM images of selected areas from FIG. 10C, showing conformal coating of silicon nitride. The bright white spots in the images have the same inner diameter as the carbon nanotubes.

MODES FOR CARRYING OUT THE INVENTION

Definitions

Figure 1:
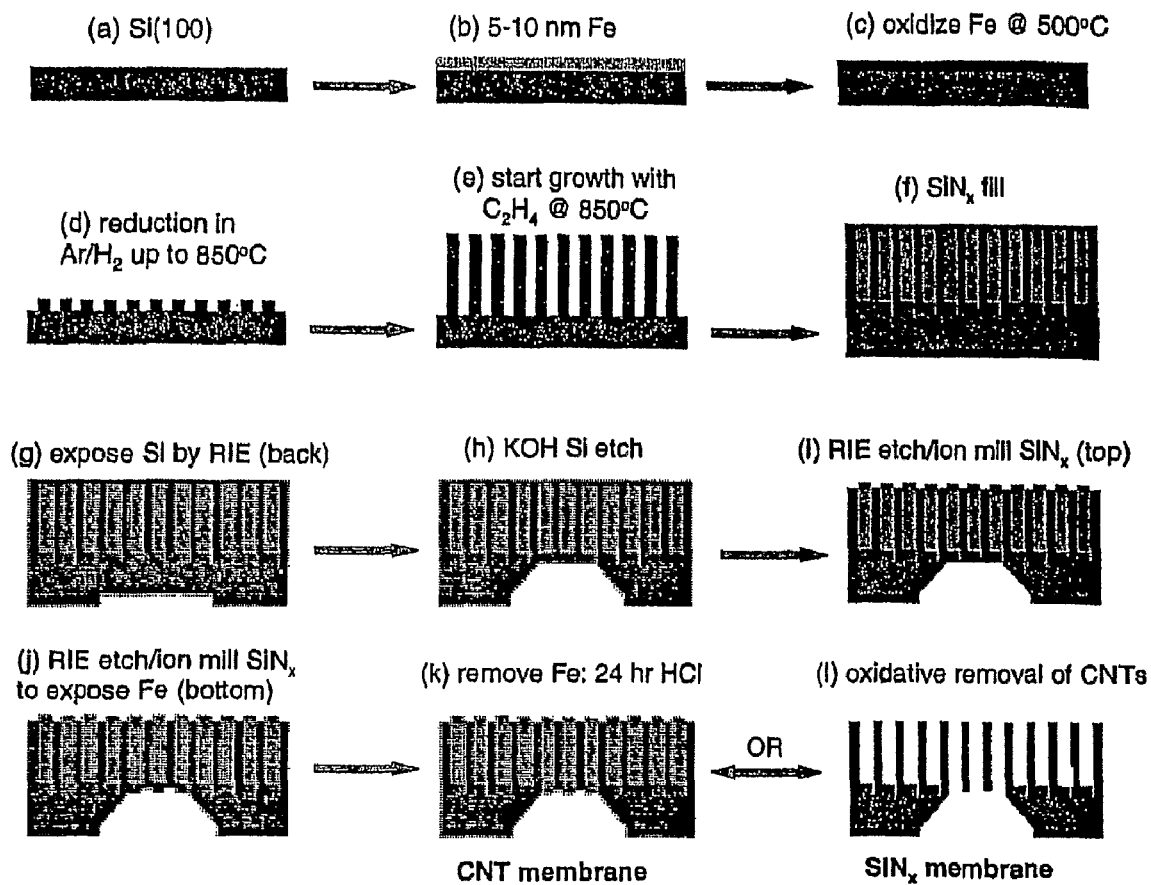
FIG. 1 provides a schematic of CNT membrane fabrication.

As used herein, the term "comprising" is intended to mean that the components or methods include the recited elements, but not excluding others. "Consisting essentially of" when used to define components or methods, shall mean excluding other elements of any essential significance to the combination. "Consisting of" shall mean excluding more than trace elements of other ingredients or components as well as substantial method steps in a process. Embodiments defined by each of these transition terms are within the scope of this invention.

As used herein the term "nanotube" intends a cylindrical tubular structure of which the most inner diameter size lies between 0.5 nm and 1000 nm. Nanotubes are typically, but not exclusively, carbon molecules and have novel properties that make them potentially useful in a wide variety of applications in nanotechnology, electronics, optics, and other fields of materials science. They exhibit extraordinary strength and unique electrical properties, and are efficient conductors of heat.

A nanotube is a member of the fullerene structural family, which also includes buckyballs. Whereas buckyballs are spherical in shape, a nanotube is cylindrical, with at least one end typically capped with a hemisphere of the buckyball structure. The name is derived from their size, since the diameter of a nanotube can be on the order of a few nanometers (approximately 50,000 times smaller than the width of a human hair), while they can be up to several millimeters in length. There are two main types of nanotubes: single-walled nanotubes (SWNTs) and multi-walled nanotubes (MWNTs). Double-walled nanotubes can also be prepared.

Nanotubes are composed primarily or entirely of $sp^2$ bonds, similar to those of graphite. This bonding structure, stronger than the $sp^3$ bonds found in diamond, provides the molecules with their unique strength. Nanotubes naturally align themselves into "ropes" held together by Van der Waals forces. Under high pressure, nanotubes can merge together, trading some $sp^2$ bonds for $sp^3$ bonds, giving great possibility for producing strong, unlimited-length wires through high-pressure nanotube linking.

Nanotubes are comprised of various materials, which include but are not limited to carbon, silicon, silica and selenium. Inorganic nanotubes such as boron nitride have also been synthesized. Carbon nanotubes include single wall, double wall, and multiwall types. A "single wall" is one tubular layer, straight or tortuous, of carbon atoms with or without a cap at the ends, while a "double wall" is two concentric tubular layers, straight or tortuous, of carbon atoms with or without a cap at the ends and a "multiwall" intends more than two concentric tubular layers, straight or tortuous, of carbon atoms with or without a cap at the ends.

The nanotubes can be arranged in an array wherein a plurality of nanotubes are organized in spatial arrangement with each other. For example, they can be aligned parallel to each other in a "vertical array" and be generally or substantially perpendicular to a substrate. Nanotubes can be grown off of surfaces that have catalyst particles disposed on the surface in an ordered or disorder array.

As used herein, the term "membrane" intends a porous material whose lateral dimension is significantly larger than the dimensions across it.

Introduction

Various membrane materials and methods for their fabrication for high flux molecular membranes or sieves are described, as well as applications of the membrane or sieve. For example, several methods for fabrication of membranes are described in which carbon nanotubes serve as pores: CNTs coupled with silicone nitride fill; CNTs coupled with vapor deposited polymer fill; CNTs coupled with coated materials deposited using Atomic Layer Deposition.

These membranes can have pore sizes on the molecular scale (ranging from approximately 1 nm to approximately 20 nm). They are robust, mechanically and chemically stable. Enhanced gas transport through the membranes compared to other materials of similar pore size is demonstrated. Molecular dynamics simulations predict high water flows through these materials too. Due to high molecular flux and possibility of size exclusion, the possible applications of these materials include but are not limited to: 1) Gas separations such as (but not limited to) removal of hydrocarbons, $CO_2$ sequestration (data showing high gas transport described below); 2) water desalination/demineralization (described below); 3) dialysis; and 4) breathable material for protection from chemical and biological agents.

The nanoporous membranes can be fabricated from a variety of a vertically aligned array of single wall, double-walled, or multi-wall CNTs, grown via an atmospheric pressure chemical vapor deposition process, as known in the art. For example, ethylene, hydrogen, and argon can be used as process gases, and a thin metal multilayer deposited on silicon can serve as the substrate to catalyze the growth. It is the uniqueness of the metal catalyst layer that enables one to grow carbon nanotubes, including SWCNTs, in a vertically aligned array, as opposed to growth in the plane of the substrate. This vertically aligned array of nanotubes typically has internal diameters ranging from, for example, 0.8-2 nm, a tube-tube spacing of less than 5 nm, preferably 1.0 to 5.0 nm, and a height (thickness) of 5-10 μm. MWCNT arrays have internal diameters on the order of 5-10 nm.

Once grown, the nanotube array can be coated by a matrix material to immobilize the tubes and enable processing into a membrane. An important factor here is the use of a conformal material that can fill the high aspect ratio (approximately 1000 length/diameter) gaps between these tubes, such that the carbon nanotubes serve as the only pores in the material. A variety of matrix materials, ranging from ceramics (e.g. silicon nitride, silicon dioxide) to polymers (e.g. parylene, polydimethylsiloxane, polyimide) may be used. Low-stress silicon nitride and TEOS oxide (tetraethoxysilane oxide) were successfully used to achieve conformal, void-free coatings on multiwall nanotube arrays (outer diameters of 20-50 nm), resulting in a high strength composite membrane. In addition to using CVD (Chemical Vapor Deposition) coatings, filling can be achieved using Atomic Layer Deposition.

It is worth noting that ceramics like silicon nitride are particularly advantageous for desalting/demineralization applications, due both to their high temperature stability (films deposited at −800° C.) and solvent resistance (to strong acids/bases), which would facilitate removal of the organic and inorganic foulants on the membrane. Parylene has also exhibited conformal properties on multiwall CNT arrays, with both high temperature stability (melting point up to 420° C.) and solvent resistance. Another important advantage is to ensure adhesion between the carbon nanotube and the matrix such that the composite material as a whole is mechanically robust. To this end, tensile strain tests on the material, as well as nanoindentation tests to examine closely the nanotube/matrix interface can be carried out. After coating, the excess matrix material can be removed from the membrane, and the carbon nanotubes can be opened, as they are initially capped at the top and blocked at the bottom with catalyst particles. This can be easily achieved by use of a plasma etching process.

Carbon Nanotubes

In one aspect, provided herein is a membrane comprised of vertically aligned array of carbon nanotubes, wherein the nanotubes have average pore size (i.e., internal diameter) of about 2 nm or less and have a matrix material disposed between the nanotubes such that the spaces between the tubes may not allow penetration of materials across the membrane.

The average pore sizes of the carbon nanotube membranes can be for example about 0.5 nm to about 20 nm, or about 1 nm to about 20 nm. In one embodiment, they are on average less than about 2 nm, but still of sufficient internal diameter to allow gas and liquid molecules to pass through them. Thus, alternative embodiments include nanotubes having average pores sizes of less than about 1.75 nm, or alternatively, less than about 1.5 nm, or alternatively, less than about 1.0 nm or alternatively between about 0.5 nm and about 2 nm, or alternatively between about 0.8 nm and 2 nm and yet further, between about 0.5 nm and about 2 nm or yet further, between about 0.5 nm and about 3 nm.

The number of pores having the aforementioned pore sizes in the membrane can be from greater than about 40%, or alternatively greater than about 45%, or alternatively more than about 50%, or alternatively, more than about 55%, or alternatively, more than about 60%, or alternatively more than about 65%, or alternatively more than about 70%, or alternatively more than about 75%, or alternatively more than about 80%, or alternatively more than about 85%, or alternatively more than about 90% or alternatively, more than about 95%, each of the total number of pores in the membrane. Typically, pore size is determined by TEM (Transmission Electron Microscope) or Raman spectroscopy method, although other methods are known in the art.

The carbon nanotubes in the membrane can be substantially single walled nanotubes or alternatively double walled nanotubes or alternatively multiwalled nanotubes or yet further comprise a combination of any of single-, double- or multiwalled. An array of substantially any one type of carbon nanotube (e.g., single, double or multi) intends greater than about 70%, or 80%, or 90% of the nanotubes in the array are of that type.

In one embodiment, the nanotubes can have open ends on one side, or on each side of the membrane. Opening can be determined by for example fluid transport through the carbon nanotube as well as analytical methods such as nanoscale electron microscopy. Nanotubes can be used in applications such as composites or cold emitters wherein the nanotube is open on but one side or is open on neither side.

In some cases, carbon nanotubes can also comprise catalyst nanoparticles at one end. For the purpose of illustration only, catalyst nanoparticles include, but are not limited to pure or alloyed iron, cobalt, nickel, molybdenum and platinum. In one embodiment, more than 70% of the nanotubes are free of catalyst nanoparticles used for carbon nanotube formation. In a further embodiment, more that 80%, or yet further, more than 90%, or even further more than 95% of the nanotubes are free of catalyst nanoparticles used for carbon nanotube formation.

The array also can be characterized by an areal density. For example, areal density can be for example at least $1\times10^{10}$/square centimeter, or alternatively at least $1.5\times10^{10}$/square centimeter, or alternatively at least $2\times10^{10}$/square centimeter, or alternatively at least $2.5\times10^{10}$/square centimeter, or alternatively, at least $3\times10^{10}$/square centimeter, or alternatively at least $3.5\times10^{10}$/square centimeter, or alternatively at least $4\times10^{10}$/square centimeter.

The array can be characterized by an average height for the carbon nanotubes. The upper end on height is not particularly limited and CNTs hundreds of microns long such as 300 microns long can be made. For example, average height can be about 0.1 microns to about 20 microns, or about 0.2 microns to about 20 microns, or about 0.2 microns to about 10 microns, or about 0.2 microns to about 5 microns. Average height can be greater than about 0.5 micron, or alternatively greater than about 1 microns, or alternatively, greater than about 3 microns, or alternatively, greater than about 4 microns, or alternatively, about 5 microns to about 12 microns, or alternatively, about 5 microns to about 11 microns, or alternatively, about 5 microns to about 10 microns, or yet further about 1 micron to about 5 microns.

The array can be characterized by high aspect ratio gaps between the individual carbon nanotubes, wherein the length is much greater than the width. For example, aspect ratio of these gaps can be at least 1,000 length/width.

Matrix Material

A matrix material can be used with the vertically aligned carbon nanotube array. Stated another way, the matrix contains the nanotubes aligned perpendicular to a membrane support. The matrix material can be a rigid material such as for example a ceramic material, e.g. such as for example silicon nitride, as well as low stress silicon nitride.

The matrix material can also be for example an oxide material such as for example silicon or aluminum oxide. Silicon oxide materials can be made from for example (TEOS) tetraethyloxysilane. The matrix material could also include silicon from, for example, a silicon source. Polysilicon can be used.

Any number of additional matrix materials can be used as long as they have the functional characteristics of having negligible molecular permeability so that flow of molecules results from channels provided by the internal space of the carbon nanotubes. Other functional characteristics can include optical impermeability, or opaqueness, indicating transmitting negligible light intensity over a certain range of wavelengths, compared to the internal space of the carbon nanotubes. Matrix can also be transparent.

The matrix material can have a thickness of for example about 100 nm to about 2 microns, or about 400 nm to about 800 nm.

The matrix material should encapsulate the carbon nanotubes. It should conformally coat the carbon nanotubes. The matrix material should be substantially free of gaps between the outer surface of the nanotube and the matrix material surrounding and encapsulating the nanotubes such that transport of materials such as gas or liquid occurs almost exclusively through the tubes in the support material.

Membrane Properties Including Enhanced Fluid Transport

The membranes can be robust, mechanically stable, and chemically stable. Ceramic membranes, such as for example silicon nitride, can be particularly advantageous for desalting and demineralization applications and gas separation due to for example high temperature stability (films deposited at about 800° C.) and solvent resistance including resistant to strong acids and bases. This can for example facilitate removal of organic and inorganic foulants on the membrane.

The membranes can have pore sizes on the molecular scale such as for example about 1 nm to about 20 nm. Additionally, they should not fracture when tested with a one atmosphere pressure drop. In one aspect, the membranes are characterized functionally in that they should not pass particles or nanoparticles such as for example 100 nm or 25 nm fluorescently labeled polystyrene beads or metallic nanoparticles of for example size of 2, 5, or 10 nm. In additional, microscopic and spectroscopic techniques using AFM (atomic force microscopy) and UV-VIS spectroscopy can functionally characterize the exclusion of 2 nm gold colloidal nanoparticles in membrane permeation.

Fabrication Methods Generally

Fabrications methods for the membranes can comprise at least two general steps. In a first step, the array of vertically aligned carbon nanotubes can be fabricated. In a second step, the gaps between the nanotubes can be filled with matrix material. Vapor deposition can be used for either or both steps.

The carbon nanotubes can be processed so that they are sufficiently open and provide for fluid flow.

In some cases, the filling step can be carried out when the carbon nanotubes are closed, but then the carbon nanotubes can be subsequently opened by for example etching.

If desired, carbon nanotubes can be removed by for example oxidation to leave open channels free of or substantially free of carbon nanotubes.

Fabrication of a Vertically Aligned Array of Carbon Nanotubes

Vapor deposition can be used by methods known in the art and described in the working examples below. The carbon nanotubes can be grown on a substrate comprising metallic nanoparticles or metallic layers.

Filling Gaps Between Carbon Nanotubes

Vapor deposition can be used including chemical vapor deposition.

Methods and Applications

The membranes can be used in a wide variety of applications including for example water desalination, water demineralization, gas separation including removal of hydrocarbons, carbon dioxide sequestration, dialysis, and breathable material for protection from chemical and biological agents.

Both charge and size effects can impact exclusion. The nanotubes can be charged at the end with positive or negative charges so that charged particles can be repulsed or attracted to the nanotubes. Charge may prevent a particle from entering the nanotube which might otherwise enter the nanotube if not for the charge. Charge effects can be more important in liquid flow with ions rather than gaseous flow.

Membranes can be used on substrates including for example silicon or glass substrates, as well as porous substrates.

Another application is for use as a high capacity adsorbent material.

Water Desalination

The membranes can be used in various fluid or liquid separation methods, e.g., water purification, demineralization, and desalination. For a general review of desalination procedures see "Review of the Desalination and Water Purification Technology Roadmap" available from the United States Bureau of Reclamation, United States Department of the Interior. See also for example U.S. Pat. Nos. 4,302,336; 4,434,057; 5,102,550, 5,051,178, and 5,376,253.

The CNT membranes can operate on the basis of both size and charge screening (Donnan exclusion and Coulombic repulsion) effects. Although many conventional membranes rely on both effects, a novelty point for this CNT membrane lies in the higher water flux achievable under conventional operating pressures.

While the present embodiments are not limited by theory, some principles are noted. The nanometer size of CNTs (for example, 0.5-2 nm), which approaches that of many solvated ions of interest to desalination process, suggests that many species would be unable to enter the nanotube and make it across the membrane. Indeed, recent molecular dynamics simulations of osmotic water transport through carbon nanotube membranes (Karla et al. (2004) PNAS 100(18):10175) suggest that 0.8 nm diameter carbon nanotubes are sufficient to block species as small as hydrated Na+ and Cl−. Yet another screening effect would be caused by charge layer overlap at the "mouth" of the nanotube pore where charges are present. The work of Miller et al. (Miller et al. (2001) JACS 13(49): 12335) has shown that carbon nanotube tips can be acid/base functionalized, providing negative/positive nanotube "mouth". In electrolyte solutions, counterions present (those of opposite charge to the functional groups on the membrane surface) to balance these tip charges. Under the appropriate ionic strength and pore size, an overlap of these counterion charge layers occurs. The net effect of this is the creation of an "ion gate" that will exclude co-ions of like charge with the functional groups and only permit counterions to pass through the channel. As a result, the CNT membrane could be designed for cation (for acid functionality) or anion (for base functionality) transmission. A characteristic of this type of exclusion is a dependency on the co-ion valency. For example, for a base-functionalized membrane (carrying positive charge), species such as $Ca^{2+}$ and $Mg^{2+}$ would be rejected to a greater extent than monovalent species like $Na^+$ and $K^+$ (Yaroshchuk, A. (2001) Sep. and Purification Tech. 143:22-23).

High water permeability for the proposed membrane can be carried out and the results interpreted in view of several studies (for example, Kahn et al. (2004) PNAS 100(18):10175; Hummer, G. (2001) Nature 414:188; Koga, et al. (2001) Nature 412:802) that have predicted high water flux through SWCNTs. The high flux predictions are partly a consequence of inherent atomic nanotube interior, which leads to nearly frictionless transport. Another factor, which appears to be unique to the non-polar CNT/polar molecule system, relates to molecular ordering that can occur on this nanometer scale. These molecular dynamic simulations (Kahn et al. (2004) PNAS 100(18):10175; Hummer, G. (2001) Nature 414:188; Koga, et al. (2001) Nature 412:802) have suggested one-dimensional ordering of water molecules confined within carbon nanotubes, leading to single hydrogen bonds between them. These so-called "water wires", which are of relevance in biological systems (Rouseau, et al. (2004) Phys. Chem. Chem. Phys. 6:1848), are able to shuttle in and out of the carbon nanotube channels rapidly as a consequence of their ordering and non-interaction with the pore walls. Recent experiments using neutron diffraction have indeed confirmed the existence of there "water wires" within carbon nanotube pores (Kolesnikov, A. (2004) Phys. Rev. Lett. 93: 035503-1), suggesting that the predicted rapid transport rates should be experimentally observable. For a practical comparison, Table 1 shows the water flux desalination membranes (Williams et al. (1999) Ind. & Chem. Chem. Res. 38(10): 3683) versus that predicted (Kalra et al. (2004) PNAS 100 (18):10175) for a SWCNT membrane. Under conventional operating pressures, the SWCNT membrane exhibits a 100× greater water flux. Alternatively, this SWCNT membrane may achieve high water flux at considerably lower operating pressures.

TABLE 1

Water flux enhancement offered by single wall carbon nanotubes

| membrane | pressure gradient (MPa) | water flux (cc/cm²s) |
|---|---|---|
| RO, FT30-BW[a] | 1.4 | $12 \times 10^{-4}$ |
| NF, Desal HL[a] | 0.7 | $15 \times 10^{-4}$ |
| SWCNT[b] | 1.4 | 0.18 |

[a]membrane composition and other relevant properties are described in Williams et al. (1999) Indus. & Eng. Chem. Res. 38(10): 3683.
[b]based on transport rated derived from those described in Karla et al. (2004) PNAS 100(18): 10175; using experimentally observed SWCNT areal density of $10^{13}$ cm$^{-2}$ Water desalination can be carried out by passing the water through multiple membranes to produce purification which removes for example at least 50 mole percent, or at least 60 mole percent, or at least 70 mole percent, or at least 80 mole percent, or at least 90 mole percent of the target molecule or ion such as for example chloride or sodium.

Fabrics

This section describes the development of a chemical/biological (CB) agent-resistant membrane based upon carbon nanotube including single wall carbon nanotube membranes. This membrane can act as a molecular sieve, exhibiting size selectivity against large (i.e. of order 1 nm) molecules, a category into which many CB agents fall (e.g., VX, Sarin, Mustard). The size selectivity of the nanotubes enables air and moisture to be exchanged, while acting as a barrier against CB agents. This combination creates a "breathable material" that can be eventually incorporated into a CB garment, suitable for use, by a warfighter.

A robust membrane comprising vertically-aligned CNTs of 1 nm approximate diameter embedded in a biocompatible, gas- and liquid-impermeable polymer matrix material can be fabricated. The nanotubes can span the membrane and will be open on both sides, serving as the only channel for air and water permeation. As a consequence of the uniqueness of the carbon nanotube surface, high air and water permeability can be achieved, making this membrane an attractive choice for incorporation into a garment.

The CNT membrane can satisfy the needs of the warfighter, while offering superior performance to conventional materials used. Without being bound by theory, the size exclusion basis of operation of this CNT membrane is believed to provide its greatest advantage over conventional activated carbon, adsorption-based materials. Significantly, comparable or better air permeability can be achieved, despite the much smaller pore size. This membrane is also flexible, durable, and resistant to fouling.

This section describes a membrane fabrication approach that will satisfy the requirements of a CB agent-resistant garment. Using an approach analogous that which has been used in fabricating larger pore membranes based on multiwall carbon nanotubes (pore size of order 10 nm), vertically-aligned single wall carbon nanotubes (pore sizes of order 1 nm) were produced that serve as the pores of the membrane. It also was shown that one can conformally coat carbon nanotubes with a polymer (e.g., parylene-N) that could serve as the matrix material of this membrane. Enhanced gas diffusion through a (multiwall) carbon nanotube membrane also was shown, with rates up to three orders of magnitude greater than predicted by classical transport models.

Two key characteristics offered by the membrane are size selectivity and high air/water permeability. Size selectivity is ensured by the use of for example single wall carbon nanotubes (SWCNTs) as the membrane pores, with sizes ranging from 0.4-2 nm in size. Such molecularly-sized pores should protect the wearer from CB agent exposure on the basis of size exclusion alone, as opposed to relying upon agent adsorption, as do many conventional CB protective garments based upon charcoal/activated carbon impregnation.

Prior examples demonstrate the fabrication of robust membranes consisting of multiwall carbon nanotubes with inner diameters of approximately 7 nm embedded in silicon nitride (J. Holt et al. (2004) Nanoletters, 4(11), 2245-2250), which is a size that is too large to achieve the desired size selectivity, but was believed that a similar process can be applied for single wall carbon nanotubes. Starting with a Si (100) substrate, a metal catalyst layer is deposited by electron beam evaporation to a thickness of a few nm, followed by an oxidation step to stabilize the surface. The sample is subsequently reduced in an Ar/H2, atmosphere as the sample is heated the growth temperature of 850° C., thus forming metal catalyst nanoparticles. Upon temperature stabilization, C2H4 is introduced, leading to the formation carbon nanotubes, with heights ranging from 5-100 um, depending upon growth time. Low-stress silicon nitride (SiNx) is subsequently deposited to fill the gaps between the nanotubes. This is followed by a series of etching steps utilizing potassium hydroxide (KOH) and reactive ion etching RIE) to expose the nanotubes at the top and bottom of the membrane.

Figure 5:
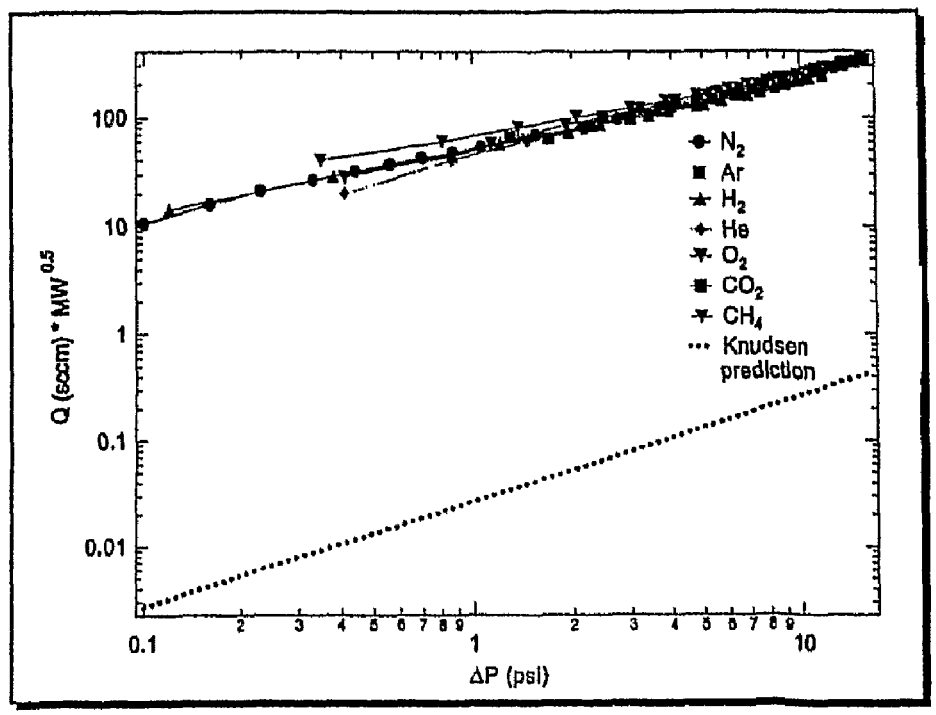
FIG. 5 illustrates plot of gas flow (normalized for molecular weight) versus pressure drop across a MWCNT/SiNx membrane of 7 nm pore size. This illustrates the significant enhancement in flux (up to 1000×) offered by carbon nanotubes compared to Knudsen prediction for similarly sized pores.

The gas permeability of this MWCNT/SiNx membrane was characterized as exhibiting rates up to three orders of magnitude greater than predicted by classical transport models. For gas diffusion within the molecular flow regime, wherein the local gas mean free path is more than one order of magnitude greater than the pore diameter, the Knudsen diffusion model is typically applied. This model assumes no interaction between gas molecules and diffuse scattering of gas molecules from the pore surface. The gas permeability measured for this membrane is up to three orders of magnitude greater than predicted by Knudsen diffusion, assuming the permporometry—(described infra) and transmission electron microscopy-observed average pore size of 7 nm, as well as an upper limit of pore density equal to that of the MWCNTs (as observed by scanning electron microscopy). FIG. 5 presents this data for a variety of gases in the form of molecular weight-normalized flow rate versus pressure drop, along with the Knudsen prediction.

These data show enhanced gas flux through a carbon nanotube membrane. This enhancement in gas flux through carbon nanotubes has previously been predicted by molecular dynamics simulations for SWCNTs (A. Skoulidas et al. (2002) Phys. Rev. Lett., 89, 18590-1), related to their inherent atomic smoothness, leading to specular rather than diffuse reflection of gas molecules from the pore surface. In particular, single wall carbon nanotubes are predicted by these simulations to exhibit a three order of magnitude higher gas flux than comparably-sized nanomaterials such as zeolites (nanoporous alumina or silica materials); this flux is also three orders of magnitude higher than predicted by assuming Knudsen diffusion. More recently, simulations on SWCNTs of up to 8.1 nm in diameter (S. K. Bhatia et al. (2005) submitted to Molecular Simulation) have similarly predicted an almost two order of magnitude enhancement as compared with the diffuse reflection limit.

For the development of a fabric based on carbon nanotubes, brittle ceramic materials such as silicon nitride would not be appropriate binding materials. Polymeric matrix materials, such as parylene-N (unsubstituted poly-p-xylylene) and Parylene-N, in particular, can be advantageous, given its chemical inertness, thermal stability (in $N_2$) up to 425° C., hydrophobicity, and pinhole-free conformal coatings with excellent gap-filling capability (Ganguli et al. (1997) J. Vac.

Figure 6:
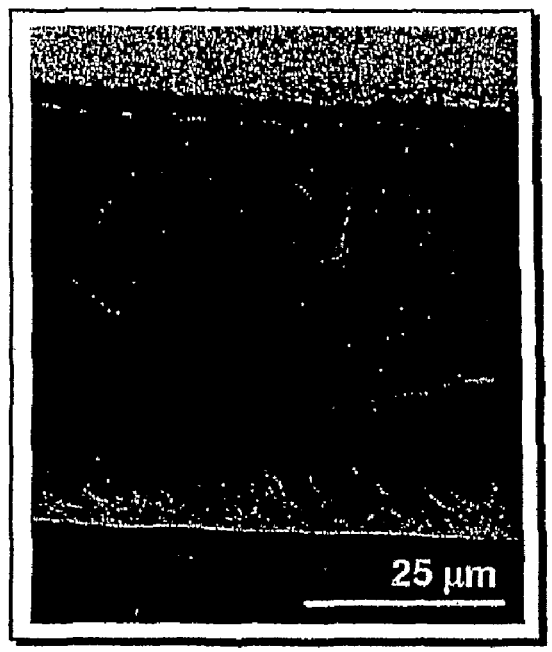
FIG. 6 illustrates parylene-N coated (five micron target thickness) MWCNT array, with supporting silicon substrates removed. The polymer is seen to effectively wet the nanotubes, with the top few microns of this membrane completely encapsulated.

Sci. Technol. A, 15, 3138). As an initial demonstration of the suitability of this process for coating carbon nanotubes, 5 µm thick layer (equivalent substrate thickness) of Parylene-N was deposited onto a 60 µm array of MWCNTs, a cross-section of which is shown in FIG. 6. The polymer is seen to wet the nanotubes effectively, forming a conformal coating, with the top few microns of this free standing membrane (the supporting silicon substrate was removed in this case) completely encapsulated by the polymer. Modifications in the deposition process, such as lower pressure operation and high temperature reflow of the parylene (near its melting point) during deposition should improve the coverage considerably, which will undoubtedly be required for coating the higher density SWCNT arrays.

Figure 7:
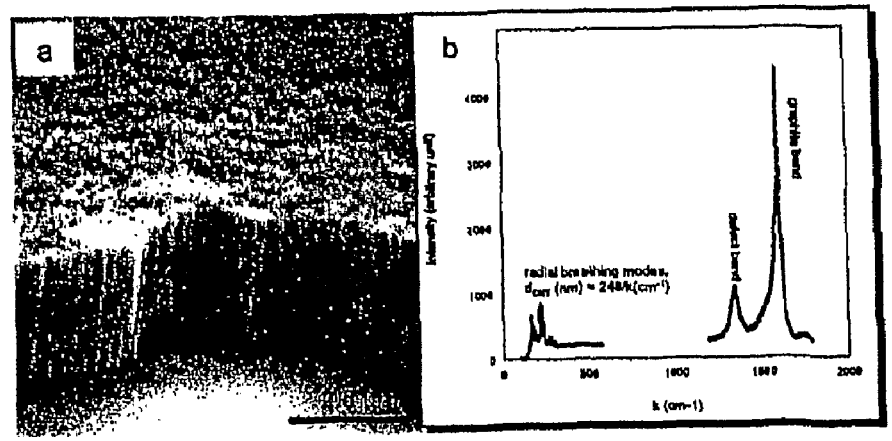
FIGS. 7A and 7B.

Growth of SWCNTs of controlled size and in a vertically-aligned configuration suitable for membrane fabrication is desired. Achieving size and orientation control of SWCNT growth is a challenging task and has thus far been reported by only a few research groups (Murakami et al. (2004) Chem. Phys. Lett., 385,298; K. Hata et al. (2004) Science, 306, 1362). Vertically-aligned SWCNT growth by use of a tri-layer catalyst composed of 100 Å Al, 3 Å Mo, and 5 Å Fe ("nominal" thickness). FIG. 7 is a scanning electron microscopy (SEM) image of these vertically aligned SWCNTs, confirmed by Raman spectroscopy to be 1-2 nm in diameter and approximately 3-4 µm in height; recent experiments have demonstrated up to 500 µm height. Void-free coating of this SWCNT array presents a challenging task, as the SWCNT areal density (10-13 $cm^{-2}$) is approximately three orders of magnitude higher than that of the MWCNTs (10 10 $cm^{-2}$), translating into gaps between the tubes with aspect ratios exceeding 1000. Many conventional deposition processes are not suitable for coating of such structures, given their high deposition rates, which does not allow sufficient time for precursors to diffuse along the surface, translating into the development of voids. The high temperature, post-deposition reflow that is possible with polymers such as parylene makes these materials preferable for this application.

In addition to a high air permeability, high water permeability is a key to the successful application of the proposed membrane. Several recent molecular dynamics simulation studies (Hummer et al. (2001) Nature, 414, 188; K. Koga et al. (2001) Nature, 412, 802) have predicted a similar enhanced water permeability through single wall carbon nanotubes. The predicted high flux of water through carbon nanotubes, which is more than one order of magnitude greater than continuum calculations would predict, relates again to the atomic smoothness of the carbon nanotube surface and to molecular ordering that can occur on the length scale of SWCNTs. These simulations have suggested one-dimensional ordering of water molecules confined within carbon nanotubes, leading to single hydrogen bonds between them. These so-called "water wires", which are of relevance in biological systems (Rouseau et al. (2004) Phys. Chem. Chem. Phys. 6:1848), are able to shuttle in and out of the carbon nanotube channels rapidly as a consequence of their ordering and non-interaction with the pore walls; water confined within such hydrophobic channels is in fact suggested to recede from the surface. Recent experiments using neutron diffraction have indeed confirmed the existence of "water wires" within carbon nanotube pores (Kolesnikov A. (2004) Phys. Rev. Lett. 93:035503-1), suggesting that the predicted rapid transport rates would be experimentally observable.

The SWCNT-membrane can exhibit superior properties to those of conventional fabrics. Its primary advantage comes with its reliance upon size exclusion of CB agents, as opposed to adsorption, while still maintaining comparable or better air permeability. Additional advantages include flexibility, durability, and resistance to fouling with the use of polymeric matrix materials such as parylene.

The key requirements for any such garment include protection against CB agents, higher that previous garments, greater flexibility and durability, the ability to be laundered, and reduced heat stress. Currently utilized overgarments have an outer shell consisting of 50150 nylon/cotton materials, with a durable water-repellent finish. The liner layer is comprised of a nonwoven front laminated to activated carbon spheres and bonded to a tricot knit back. The use of a charcoal or activated carbon-containing liner layer, in which the all-important CB agent adsorption takes place, is common to a wide array of conventional CB protective garments.

However, problematic to the use of activated carbon is adsorption by a large number of Volatile Organic Compounds (VOCs). In a battlefield scenario, environmental contaminants such as cigarette smoke, jet fuels, and diesel exhaust have been demonstrated to displace previously adsorbed chemical agents in activated carbon or inhibit their initial adsorption (J. E. Roehl et al., "Residual Life Indicators—Point Chemical Detectors Used to Measure the Capacity of Activated Carbon in Protective Garments, Gas Mask Filters, and Collective Protection Filters", Scentczar Corporation Report). It is the non-polar surface of activated carbon which lends its affinity to non-polar adsorbates like VOCs. Adsorption may arise by both physisorption and chemisorption mechanisms. As a result, the adsorption properties of activated carbons are a complex combination of surface area, pore size, temperature, adsorbate concentration, and contact time. This, in turn, lends considerable variability in the protective ability of activated carbon-based garments, necessitating the development of Residual Life Indicators (RLIs), which indicate the useful remaining capacity of such a garment.

The development of effective and meaningful testing protocols is important in the development of CB agent-resistant fabrics given the critical nature of their service requirements. For a series of different air-permeable charcoal impregnated suits, protocols were developed at Aberdeen Proving Grounds to test for vapor permeation of Sarin (GB) and Mustard (HD) from liquid contamination. For the vapor permeation test, swatches of the fabric to be tested had a fixed amount of liquid agent applied (10 $g/m^2$) to the top surface, while mounted in a sealed flow cell. A constant pressure drop of 0.1 inch of water (0.004 psi) was maintained across the swatch by drawing air into the lower test cell chamber. Over a 24 hour period, gas samples were acquired sequentially with a miniaturized gas chromatograph sampling system, utilizing a 2 minute desorption time from a pre-concentrator tube followed by a 1 minute gas sampling time.

The evaluation criteria used in these studies were determined by the percutaneous (skin) dosages at which certain physiological effects would be observed (Table 2). Sarin, for example, can produce incapacitation (twitching, convulsions, or loss of consciousness) at dosages of 8,000 mg-min/$m^3$ and can be lethal at dosages of 15,000 mg-min/$m^3$. An aerosol test was performed as well, to simulate biological or chemical particulates of 0.4-5 nm diameter. The test involved measurement of the penetration of a challenge corn-oil aerosol through gaps between ensemble components of the air-permeable suit.

The SWCNT-membrane can offer a number of advantages over conventional activated-carbon based materials such as LANX (R. S. Lindsay et al. (September 2002) "Test Results of Air-Permeable Charcoal Impregnated Suits to Challenge by Chemical and Biological Warfare Agents and Simulants:

Summary Report", U.S. Army Soldier and Biological Chemical Command Report, ECBC-TR, Aberdeen Proving Ground, MD, UNCLASSIFIED Report). Its primary advantage over fabrics like LANX lies in its enhanced protection against CB agents. This enhancement is possible due to its principle of operation—the size exclusion of CB agents, given the comparable or larger size of conventional CB agents as compared with the pore size of this membrane (approximately 1 nm). The SWCNT membrane does not rely upon adsorption, as does LANX, and this significantly reduces its fouling tendency. In the study of Lindsay et al. (R. S. Lindsay et al. (September 2002) "Test Results of Air-Permeable Charcoal Impregnated Suits to Challenge by Chemical and Biological Warfare Agents and Simulants: Summary Report", U.S. Army Soldier and Biological Chemical Command Report, ECBC-TR, Aberdeen Proving Ground, MD, UNCLASSIFIED Report), exposure thresholds (defined as the areal density of agent required to permeate the suit to produce a given physiological effect) were calculated for the various agents (Table 2 lists those for Sarin). For the SWCNT membrane, the agents are not anticipated to permeate across the membrane, and thus the exposure thresholds may be taken to be infinite for all practical purposes. The LANX fabrics rely upon agent adsorption as opposed to size exclusion (as they have considerably larger pore sizes), and thus these threshold rating are a required specification. Other physical properties of this membrane are also favorable for this application. Conventional fabric air permeabilities (pressure normalized) determined in the study by Lindsay et al. (R. S. Lindsay et al. (September 2002) "Test Results of Air-Permeable Charcoal Impregnated Suits to Challenge by Chemical and Biological Warfare Agents and Simulants: Summary Report", U.S. Army Soldier and Biological Chemical Command Report, ECBC-TR, Aberdeen Proving Ground, MD, UNCLASSIFIED Report) ranged from 1.1-23 $cm^3/cm^2$-min-Pa. By comparison, these measurements on MWCNT membranes yielded air permeabilities of between 0.13-0.17 $cm^3/cm^2$-min-Pa (for 10 pm thickness). However, for this SWCNT membrane, air permeability enhancement is expected up to 30×, due to the three order of magnitude increase in pore density, to offset the reduction in pore size. This translates to air permeability values of approximately 5.1 $cm^3/cm^2$-min-Pa (for 10 pm thickness), quite comparable to or better than some of the activated-carbon based materials Table 2). It is somewhat counterintuitive that such high air permeabilities are possible, given the nanometer pore size of this membrane. However, the high pore density ($10^{13}$ $cm^{-2}$) of the membrane, coupled with atomic smoothness of carbon nanotubes leads to significant enhancements in gas transport.

For reasons discussed previously, related to the inherent atomic smoothness of carbon nanotubes, enhanced air permeability of a nanotube-based membrane is expected to translate into enhanced water permeability as well. It is also worth noting the extremely high thermal conductivity of carbon nanotubes of 2000 W/mK, as compared with 400 W/mK for copper. These characteristics can make for a fabric that exhibits the reduced heat stress. As a means of quantifying the fabric response to variable heat and moisture loads, as encountered during sweating, a standard testing method (ISO-STD 11092) is available, referred to as the "Dynamic Sweating Hot Plate" method.

The weight of this SWCNT membrane alone (on an areal basis) should be less than that of the LANX fabric (12.3-123 g/m² versus 250 g/m³ A description of which is available at the web site: lanxfabrics.com/CPOShellFabrics.htm), given the smaller effective thickness (10-100 μm versus 0.4 mm), but it is anticipated that this membrane will not be used in a standalone fashion, and instead will be integrated with another supporting, highly porous fabric, which will make these areal weights somewhat higher. Flexibility, should easily be satisfied for this SWCNT membrane, given the use of a polymeric matrix material such as parylene, along with carbon nanotubes, which unlike many other fibers in reinforced composites, can undergo severe bending (angles of, up to) 110° (Iijima et al. (1996) J. Chem. Phys.: 104(5):2089-2092) and still preserve their structural integrity. The key issue for the durability of the membrane concerns the nanotube-matrix interface and the degree of adhesion at this interface. Results coating MWCNT's with parylene-N show excellent wettability (due to the similar hydrophobicity of the two materials). A comparison of our proposed SWCNT fabric (in its final form) with that of the LANX in terms of properties such as grab strength (method ASTM D-5034) and bursting strength (ASTM D-3787) (durability) will not be possible initially, as we will need to survey a variety of supporting porous fabrics for integration with the membrane. The SWCNT membrane should be intrinsically strong enough such that the properties of this supporting fabric will dictate the overall mechanical properties of the material. For example, the grab strength (a type of tensile strength test) of the LANX fabric is approximately 11 psi A description of which is available at the web site: lanxfabrics.com/CPOShellFabrics.htm), while parylene-N has an intrinsic tensile strength orders of magnitude higher (up to 65,000 psi) A description of which is available at the web site: vp-scientific.com/parylenepropertes.htm). By appropriate choice of the supporting fabric, our SWCNT membrane can match or improve upon the mechanical properties of the LANX fabric.

Figure 8:
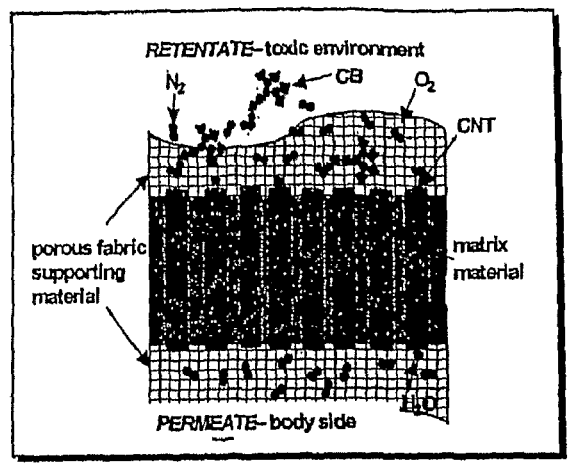
FIG. 8 illustrates SWCNT membrane fabric in its final integrated form. CB represents a hypothetical chemical/biological agent, which cannot permeate through the membrane due to size exclusion. A porous fabric supporting material will be integrated with the SWCNT membrane. Performance improvements can include functionalization of the nanotubes on either side of the membrane to achieve body side hydrophilicity and environment hydrophobicity to promote water repellency.

The other major advantage offered by the SWCNT-membrane is its robustness. Carbon nanotubes are chemically inert (no dangling bonds, except at the tips), solvent resistant, and stable in air up to 400° C. Polymers such as parylene-N are biocompatible, chemically inert, thermally stable at high temperatures (approximately 400° C.), hydrophobic, and resistant to chemical attack by a variety of solvents due to the absence of polar entities in the material (Rogojevic et al. (1999) J. Vac. Technol. 17(1):266-274; Hou et al. (2002) Macromolecules 35:2429-2431). For these reasons, minimal or no "fouling" of the membrane by either CB agents or other environmental contaminants can be achieved, and the material should clearly have the ability to be laundered without degradation. Activated carbon-based fabrics such as LANX, by contrast, are capable of being fouled by VOCs, lending them a finite lifetime and necessitating—the aforementioned Residual Life Indicators. Given that the SWCNT membrane relies upon size exclusion as its mechanism of operation rather than adsorption, it should, in principle, have an indefinite lifetime. An illustration of the SWCNT fabric, in its final integrated form is shown in FIG. 8.

Dialysis

The material as described herein also finds use in biological applications, e.g., for nanofiltration similar to that performed by the kidney. For example, the nanotubes and membrane containing the nanotubes can be used for separation of analytes in blood or serum and therefore provides methods and materials for dialysis ex vivo and in vivo.

Figure 14:
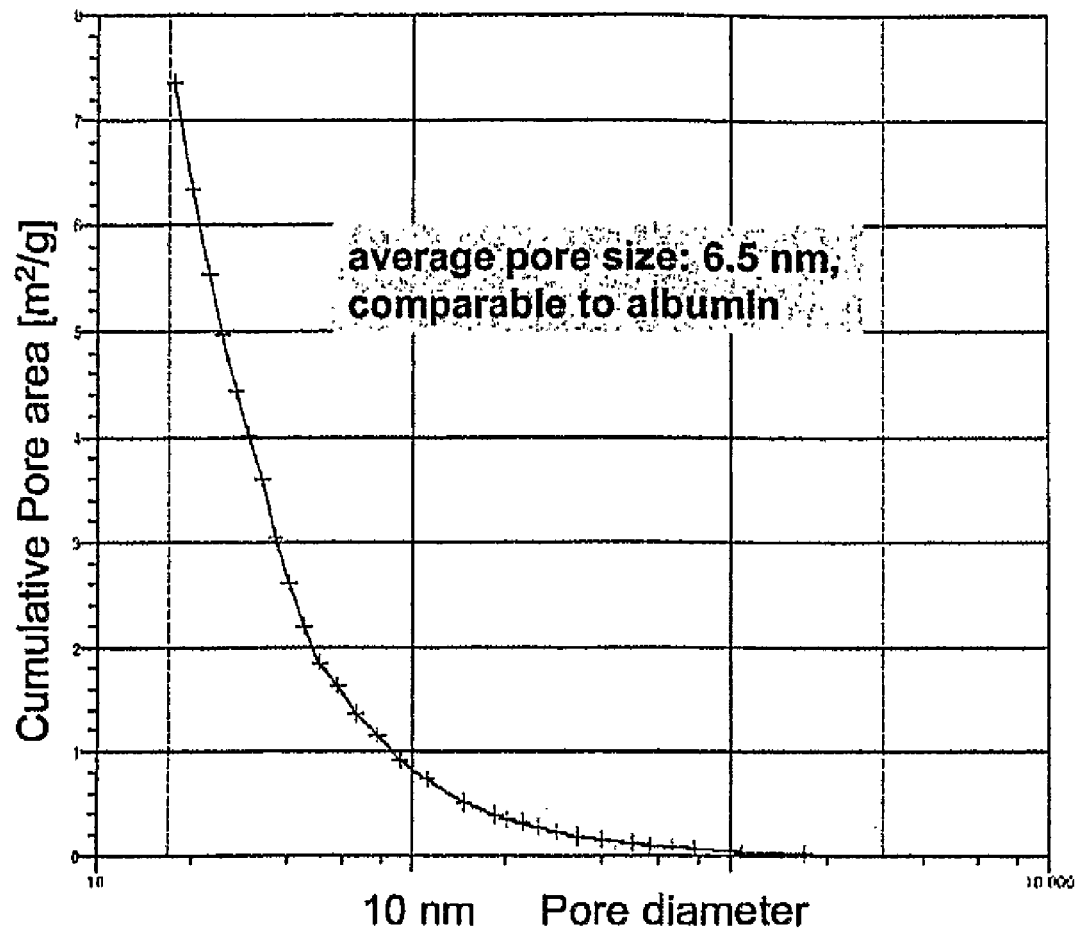
FIG. 14 shows pore size distribution of a multiwall carbon nanotube membrane, illustrating an average pore size of 6.5 nm, with less than 10% of the surface area being contributed by pores 10 nm or larger. Such a pore size distribution would enable filtration of albumin for use in dialysis applications.

Some of the recent advances in dialysis have been in the area of porosity-controlled, high-flux synthetic membranes. Porosity control is important to achieve the desired separation/sieving profile, with maximal permeability for solutes of <40 kD molecular weight and minimal or no permeation of albumin (48 kD molecular weight, approximately 6-7 nm effective diameter). High-flux membranes offer the important advantage of reducing the treatment time. Multiwall carbon nanotube membranes offer both the requisite porosity control (filtering out albumin on the basis of size exclusion), as well as a much higher flux than that offered by current nanoengineered dialysis membranes. The presence of negatively charged functional groups on the membrane also help reduce the permeation of the similarly charged albumin. FIG. 14 shows porosity control.

Gas Separation

Gas permeability of MWCNT/SiNx membrane was characterized and membranes have shown measured rates of up to three orders of magnitude greater than predicted by conventional models. For gas diffusion within the molecular flow regime, wherein the local gas mean free path is more than one order of magnitude greater than the pore diameter, the Knudsen diffusion model is typically applied. This model assumes no interaction between gas molecules and diffuse scattering of gas molecules from the surface dominating. The gas permeability measured for this membrane is up to three orders of magnitude greater than predicted by Knudsen diffusion, assuming the nitrogen porosimetry-observed average pore size of 7 nm described infra and an upper limit of pore density equal to that of the MWCNTs (as observed by scanning electron microscopy). FIG. 5 presents this data for variety of gases in the form of molecular weight-normalized flow rate versus pressure drop, along with the Knudsen prediction. These results constitute the first experimental demonstration of enhanced gas flux through a carbon nanotube membrane. This enhancement in gas flux through carbon nanotubes has previously been predicted by molecular dynamics simulations for SWCNTs, related to their inherent atomic smoothness, leading to spectacular rather ban diffuse reflection of gas molecules from the pore surface. In particular, single wall carbon nanotubes are predicted by these simulations to exhibit a three order of magnitude higher gas flux than comparably-sized nanomaterials such as zeolites (nanoporous alumina or silica materials); this flux is also three orders of magnitude lighter than predicted by assuming Knudsen diffusion. More recently, simulations on SWCNTs of up to 8.1 nm in diameter [S. K. Bhatia, H. Chen, and D. S. Sholl, "Comparisons of Diffusive and Viscous Contributions to Transport Coefficients of Light Gases In Single-Walled Carbon Nanotubes", submitted to Molecular Simulation, 2005] have similarly predicted an almost two order of magnitude enhancement as compared with the diffuse reflection limit. As will be apparent to those of skill in the art, the membranes as described herein can also be used for filtration and separation of large airborne particles from gases and gas mixtures using the techniques described.

WORKING EXAMPLES

The various embodiments described herein are further illustrated with use of the following non-limiting working examples.

Example 1

This example describes the manufacture of multiwalled carbon nanotubes embedded in a silicon nitride matrix.

Figure 2:
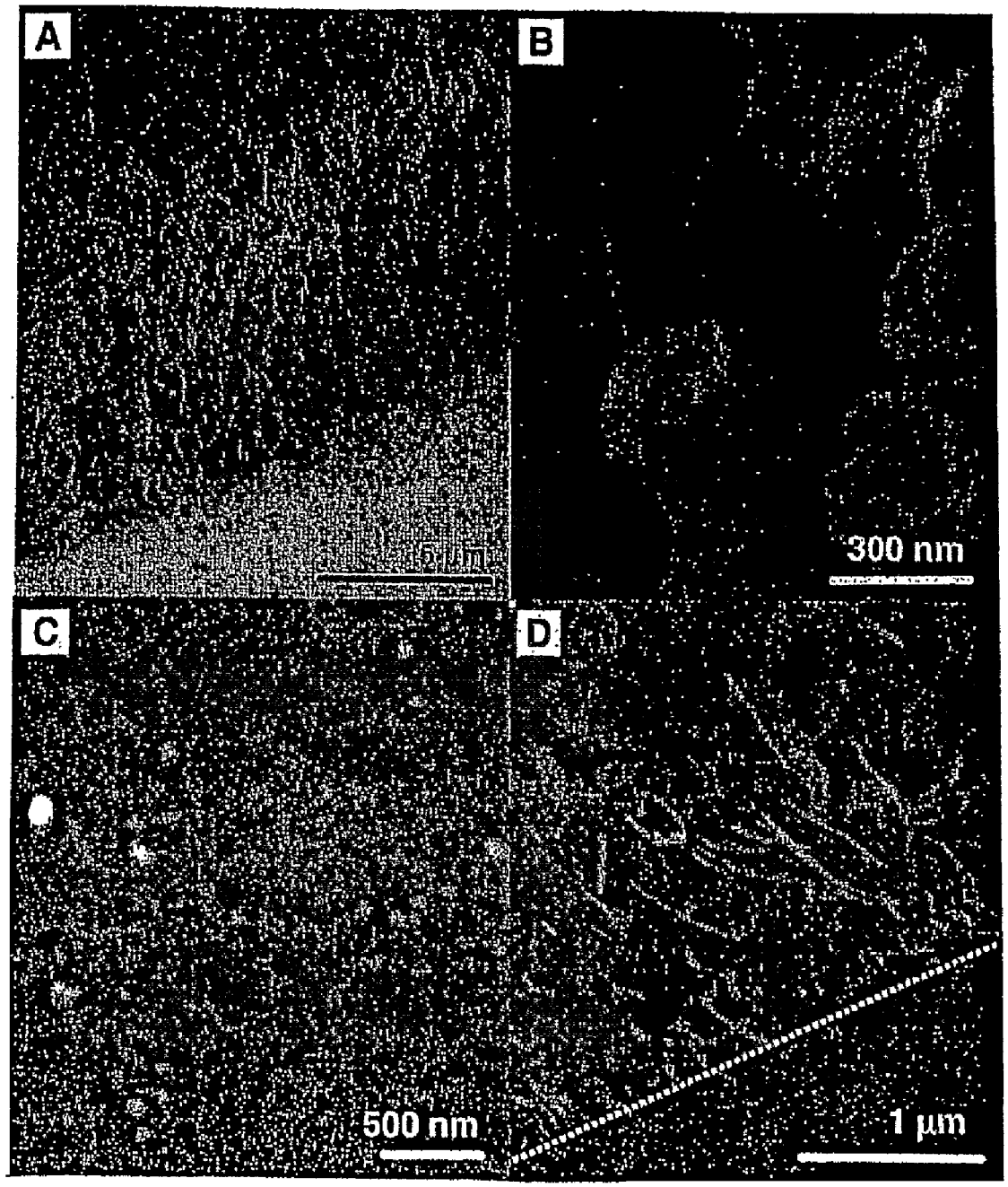
FIGS. 2A through 2D illustrate (A) as-grown array of multiwalled CNTs, (B) CNTs encapsulated by a silicon nitride layer, (C) backside of membrane after KOH/ion milling treatment; bright particles were confirmed by EDX to be residual iron not removed after the acid treatment, (D) cross-sectional image of silicon nitride-covered CNTs; the void-free region of the membrane is denoted by the dashed line; individual CNTs can be distinguished as white lines in the image.

The entire fabrication process for these membranes is illustrated in FIG. 1. The starting material is single-side polished test grade Si(100). The catalyst used for nanotube growth is iron, deposited by electron beam evaporation to a thickness between 2.5-5.0 nm. The samples are annealed shortly after the deposition of iron (500° C., 1 hour, 10 sccm $O_2$) to oxidize the surface using a method described in Fan et al. (1999) 283:512-514. Samples which undergo room temperature oxidation in air over several days were observed to have a reduced catalytic efficiency, producing a lower density array of nanotubes. Samples are next placed into an atmospheric pressure CVD system (1" diameter tube furnace) and initially exposed to a reducing environment of Ar/$H_2$ (600 sccm/400 sccm) as the temperature is ramped up to the growth temperature of 850° C. for a period of 20 minutes. At this point, discrete iron nanoparticles form, with diameters in the range from 20-100 nm. The diameter distribution is skewed towards smaller particles as the iron thickness is decreased. The iron nanoparticles serve as the catalyst and nucleation sites for nanotube growth. After temperature stabilization, $C_2H_4$ (1000 sccm) is introduced to initiate nanotube growth. Nanotube growth occurs for 20 minutes and results in a dense array of multiwall nanotubes of ~5-10 µm length and 20-50 nm diameter, as shown in FIG. 2A. The tube areal densities are typically $4 \times 10^{10}$ cm$^{-2}$. Filling the voids between the nanotubes with a rigid, impermeable material that conforms to the tubes enables processing into a membrane. The properties of low-stress silicon nitride renders this material particularly suitable for this purpose. Thus, after tube growth, the samples are placed into a low pressure CVD furnace to deposit a low-stress silicon nitride layer, using a deposition temperature of 800° C. and a 6:1 ratio of dichlorosilane to ammonia. A target film thickness between 400-800 nm was found sufficient to fill the bulk of the 5-10 µm thick nanotube forest and encapsulate the top. Due to the non-oxidizing atmosphere for the silicon nitride process, carbon nanotube damage is not observed at these elevated temperatures and the tubes retain their alignment through the process. Also, there is little concern over the filling of the nanotube interior with silicon nitride, as it has been observed by transmission electron microscopy (TEM) that the nanotubes grow with a graphitic cap at the top. The excellent coverage offered by this material can be seen in the image of FIG. 2B, where the film (partially fractured by preparation of the cross section) is seen to encapsulate an individual nanotube.

A number of additional processing steps are required before continuous, open channels can be formed. Reactive ion etching (RIE), using a 3.6:1 ratio of $CF_4:O_2$ at 150 W power, is used to open a window in the silicon nitride layer to expose the backside of the silicon substrate. This is followed by anisotropic KOH etching of the exposed silicon to uncover the nanotube/silicon nitride film. To remove excess silicon nitride deposited atop the CNTs (opposite the silicon substrate), as well as open their tips, RIE is used once again. Alternatively, Ar-ion milling can be used under conditions of 0.5 kV ion energy and 1 mA/cm$^2$ beam current density; due to the lack of material selectivity, this process typically produces a much smoother surface. It is important that this tube-opening step occurs after the KOH wet processing to avoid the possibility that the exposed carbon nanotubes are filled by liquids. Examination of the interface where the silicon was removed by KOH etching (referred to as the "backside" of the membrane) reveals a number of bright particles (FIG. 2C), which were confirmed by Energy Dispersive X-ray (EDX) analysis to contain iron. Consideration of their size (20-50 nm), comparable to the outer diameter of the carbon nanotubes, suggests that these are residual iron catalyst particles not removed during the prior processing steps. As many of these particles would block access to the core of the nanotube, a strategy for their removal was devised. This consists of a brief RIE process (or the aforementioned ion milling process) to remove a few nm of silicon nitride and further expose the iron nanoparticles. FIG. 2C depicts the backside of the membrane after the ion milling process, with pores of 40-90 nm evident, comparable in size to the iron nanoparticles and the nanotube outer diameter. After the etching/ion milling step, the iron nanoparticles are removed by immersion of the sample in concentrated HCl for 24 hours. Subsequent EDX analysis confirmed the removal of the vast majority (>90%) of the nanoparticles. At this stage, the carbon nanotube membrane fabrication is complete. If a nanoporous silicon nitride membrane is desired instead, the nanotubes can be removed by an oxidation treatment (800° C., 10 sccm $O_2$, 1 hour).

The mechanical integrity of these membranes is an important issue for their subsequent characterization. Due to the inherent brittle nature of ceramic materials like silicon nitride, voids that remain after processing (due to incomplete coverage of the nanotube array) can lead to cracks and ultimately fracture the membrane; FIG. 2D is a cross-sectional image of the membrane in which such voids in the interior of the membrane are evident. However, the CNTs may provide a modest reinforcement effect, as the work of Ma et al. (Ma et al. (1998) J. Mater. Sci. 33:5243-5246), on multiwall CNT-silicon carbide composites suggests, by deflecting cracks that might otherwise propagate and rupture the membrane. To test the mechanical integrity of the CNT-silicon nitride composites fabricated in this study, fully processed CNT membranes were mounted in an O-ring sealed fixture with one side open to air and the other placed under vacuum. Only one out of five membranes fractured under these testing conditions. Using an expression derived from van Rijn et al. (Rijn et al. (1997) J. Microelectromech. Syst. 6:48-54) the theoretical maximum pressure drop a solid silicon nitride membrane can withstand prior to rupture (delta P) is given as:

$$\Delta P = 0.29 \left(\frac{t_m}{r_m}\right) \sigma_{yield} \sqrt{\frac{\sigma_{yield}}{E}}$$

(Reproduced from Sun et al. (2000) supra),
where $t_m$ is the membrane thickness (5 µm), $r_m$ is the membrane radius (2.5 mm), and $\sigma_{yield}$ and E are the yield stress and Young's modulus for the silicon nitride. Using the yield stress of bulk silicon nitride of 4 GPa and a Young's modulus of 385 GPa (see Tong et al. (2004) Nano. Lett. 4:283), a value of approximately 2 atm is calculated for the experimental geometry. The observation that most of the CNT-membranes could withstand a comparable pressure drop (1 atm) suggests that the voids in the bulk of the material do not significantly weaken the membrane and produce cracks. The nanoporous silicon nitride membranes were observed to be similarly robust, suggesting that nanotube reinforcement may not be significant and that it is the overall low void fraction of the membrane that accounts for its strength.

Figure 3:
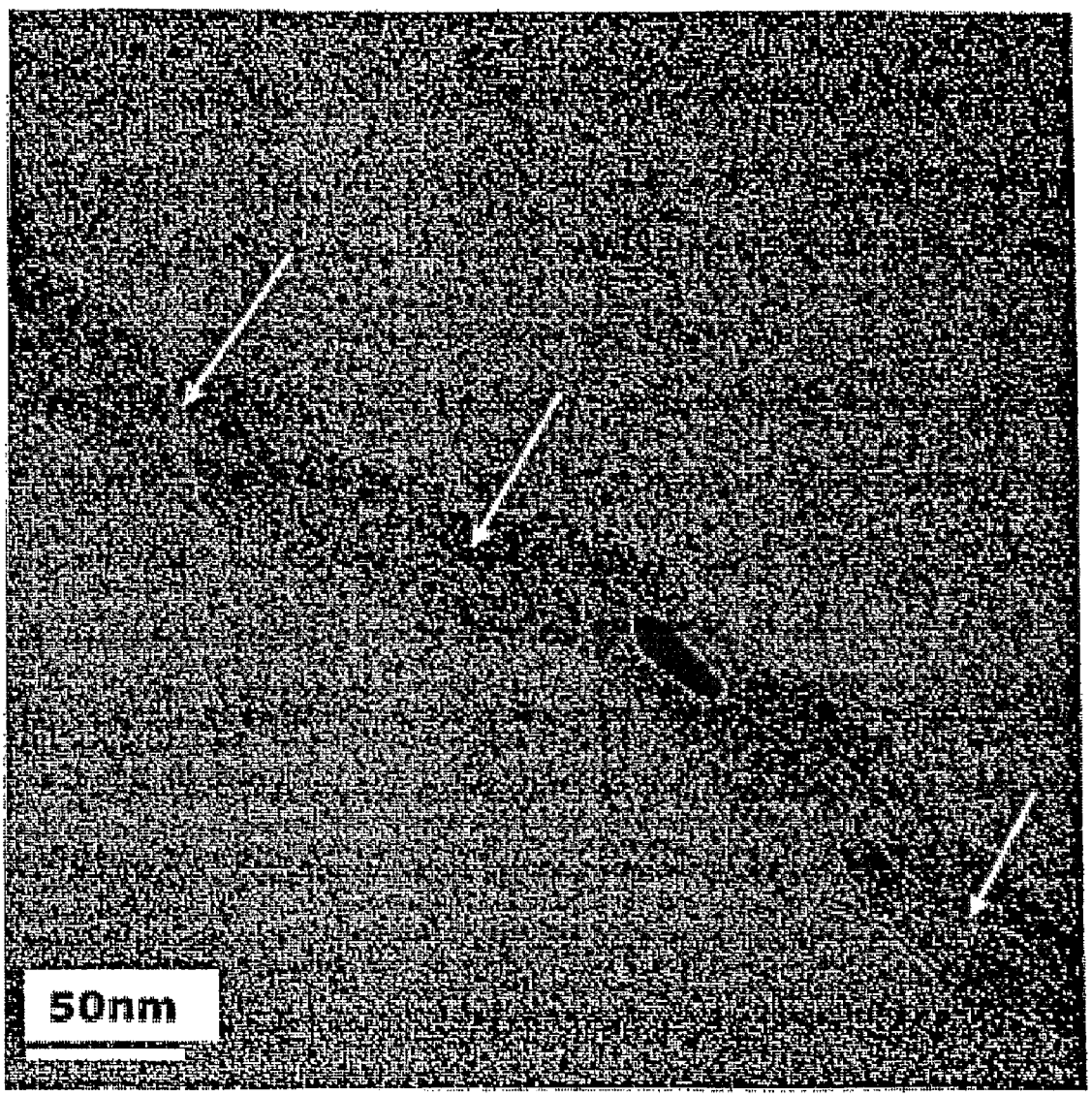
FIG. 3 provides a TEM image of a multiwall CNT produced by thermal CVD; arrows indicate graphitic shells that block the interior of the tube, characteristic of "bamboo" CNTs; the dark material is iron catalyst that has migrated to the interior of the tube.

Another concern during processing is the possibility that the voids in the interior of the membrane will be uncovered during etching of the silicon nitride. Cross-sectional micrographs of the membranes have shown a continuous, void-free region extending ~100 nm from the silicon interface (FIG. 2D). As another gross check on membrane integrity, and to ensure that the large voids are not propagating through the membrane, fluorescent tracer experiments were conducted. Epoxy was used to bond the fully processed CNT membrane to reservoirs on either side. In one side, pure water was used, while in the opposite, fluorescently-labeled polystyrene beads of first 100 nm, then 25 nm diameter (in a separate experiment) were placed in solution, both smaller than the apparent voids of several 100 nm in FIG. 2D. After a period of 48 hours, solution from the pure water reservoir was extracted and examined by fluorescence confocal microscopy. There was no evidence for diffusion of the labeled polystyrene beads in either experiment, suggesting that these voids in the membrane interior do not propagate through, leaving the nanotube interior as the most likely conduit for molecular transport. Transmembrane voids from the matrix material can be avoided. These measurements were followed by isotopic tracer measurements where deuterated water ($D_2O$) was placed in one reservoir and pure water in the other. After a period of 24 hours, a sample was extracted from the pure water reservoir and analyzed by stable isotope mass spectrometry, with a sensitivity of approximately 1 part per million deuterium relative to hydrogen. There was no evidence for diffusion of $D_2O$ in this case, which provides an upper bound on the rate of permeation through the membranes of $2.4 \times 10^{-8}$ mole/$m^2$-s (as determined by the sensitivity of the analytical technique). This is in sharp contrast to the flux of 0.29 mole/$m^2$-s, calculated by molecular dynamics simulations for diffusion through considerably smaller single wall carbon nanotubes (Hummer et al. (2001) Nature 414:188-190). If indeed the only open channels in this experiment consisted of the interior of the carbon nanotubes, a measurable flux of $D_2O$ would have been expected. The low flux observed here suggests that this channel is blocked. Specifically, it is possible that the CNTs in this membrane are not hollow and instead form the well-known "bamboo" morphology (Cui et al. (2001) 88:6072-6074), consisting of periodically spaced chambers along their length. In the literature, characterization of the nanotube morphology is often based on TEM of a small fraction (~100 nm) of the entire length (often in excess of 10 µm). Thus, it seems probable that even the nominally hollow tubes reported in the literature may in fact be blocked. The majority of the CNTs in this study show evidence of the "bamboo" morphology, as can be seen in the TEM micrograph of FIG. 3.

Figure 4:
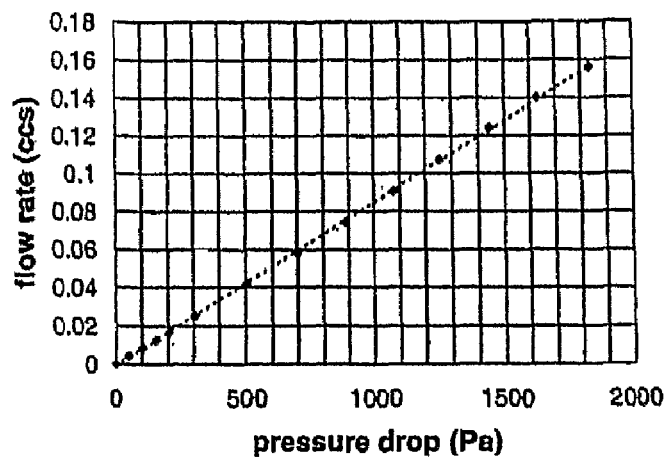
FIG. 4 illustrates flow rate versus pressure drop data obtained for a nanoporous silicon nitride membrane.

To produce open, nanometer-scale channels through which molecular transport could be measured, a carbon nanotube membrane was placed into an oxygen furnace (800° C., 1 hour, 10 sccm $O_2$) to allow selective oxidation of the nanotubes. The resulting nanoporous silicon nitride membrane was then mounted in an O-ring sealed flow cell with a mass flow controller and pressure gauge upstream of the membrane. A pressurized nitrogen line was attached upstream, with the other end open to air. A control experiment utilizing a non-porous material of similar dimensions confirmed that all connections were leak tight, such that the membrane would be the only gas transport path. By measuring the flow rate as a function of pressure drop (see FIG. 4), the permeance of the membrane could be determined. For pressure drops in the range from 50-1800 Pa (0.007-0.27 psi), a permeance of $4.7 \times 10^{-4}$ mole/$m^2$-s-Pa was determined. This compares with a value of $2.6 \times 10^{-6}$ mole/$m^2$-s-Pa, determined for a multiwall CNT membrane with pores reported to be 7.5 nm in diameter (Hinds et al. (2004) supra), in the range expected of CNT inner diameters. Given that the membrane in this study was created by oxidative removal of the CNTs, one would expect larger pores, representative of CNT outer diameters, which in turn should lead to a larger membrane permeance and a low percentage of open tubes. Data obtained from TEM measurements (FIG. 3) suggests a size distribution of CNT outer diameters ranging from 20 to 50 nm. To determine whether the measured membrane permeance can indeed be accounted for by pores in the size range of the CNT outer diameter, one can consider a model for molecular transport.

The behavior of fluids on the size scale of these membrane pores is expected to differ from that of bulk, continuum transport. In particular, a comparison of the mean free path at 1 atm for nitrogen (66 µm) with that of the nitride pore size (20 to 50 nm) suggests a transitional flow regime, between slip and free-molecule flow (Bird et al. Molecular Gas Dynamics, Clarendon Press: Oxford United Kingdom (1976)). Previous work by Itaya et al. (Itaya et al. (1984) J. Chem. Eng. Jpn. 17:514) with alumina membranes has shown that Knudsen diffusion can adequately characterize molecular transport down to 10 nm length scales. Thus, assuming Knudsen diffusion, where gas-solid collisions are treated as elastic and result in diffuse scattering, the gas molar flux across the membrane is linear in pressure drop:

$$J = \left( \frac{\pi r^2 \rho C}{V_g \sqrt{2\pi MRT}} \right) \Delta P$$

(Reproduced from Miller et al. (2001) supra), where r is the pore radius, M is the molecular weight, R is the gas constant, T is temperature, $\rho$ is the pore areal density, $V_g$ is the gas molar volume, $\Delta P$ is the pressure drop, and C is an aspect ratio dependent factor$\approx(1+0.46 \cdot L/r)^{-1}$ (Elwenspoek et al. (1998) Silicon Micromachining, Cambridge Univ. Press: Cambridge, England, pp. 216-355), with L being the effective diffusion length. Using the experimentally measured permeance P(=J/$\Delta$P) of the nanoporous silicon nitride membrane, along with other membrane parameters, in the limit L>>r, the average pore radius can be determined as follows:

$$r = \left( \frac{1.1\sqrt{MT}\, \mathcal{P} L}{\rho} \right)^{1/3}$$

(Reproduced from Harrell et al. (2003) supra), for a typical membrane pore density of $4 \times 10^{10}$ cm$^{-2}$ and an effective diffusion length of 10 μm (accounting for the membrane thickness and nanotube tortuosity), an average pore diameter of 66 nm is determined. This value is slightly larger, but comparable to the outer diameter of CNTs observed by TEM. This larger-than-expected value could be accounted for by tightly bundled CNTs that could not be completely filled by the silicon nitride. For reference, the permeance of a microporous alumina filter (Whatman Anodisc) of 200 nm nominal pore diameter (60 μm thickness, $1.6 \times 10^{19}$ cm$^{-2}$ pore density) was measured, and the Knudsen diameter calculated from this measurement was ~180 nm, similar to SEM observations of the pore size. For considerably smaller pores (in the 1 nm range of single wall nanotubes), it is expected that the molecule-pore interaction will differ from the simple elastic collision model assumed in Knudsen diffusion. In particular, it is expected to see a dependence on the molecular coverage of the surface. Modeling and experiments in this size regime can be carried out.

Also of interest for subsequent liquid experiments is an estimate of the flux of water across a nanotube membrane. The method of van Rijn et al. (Rijn et al. (1995) IEEE Conf. MEMBS '95; pp 83-87) was used for this calculation, which assumes viscous, laminar flow and includes correction factors for frictional losses with the walls, interference effects of neighboring pores, and neglects any nonviscous kinetic losses. Under these assumptions, in the limit L>>r, the water molar flux is given as:

$$J = \left( \frac{0.12 r^2}{\mu L V_w} \right) \Delta P$$

(Reproduced from Cooper et al. (2004) supra), where μ is the liquid viscosity, $V_w$ is the molar volume of water, and all other variables are defined as before. For a 10 nm inner diameter nanotube of 10 μm length and a pressure drop of 1 atm, a water flux of 1.91 mole/m$^2$-s is calculated. For a 1 nm inner diameter nanotube, the corresponding water flux is 0.019 mole/m$^2$-s, an order of magnitude less than the 0.29 mole/m$^2$-s value determined for a similar size single wall nanotube, using molecular dynamics-based transport rates (Hummer et al. (2001) supra). However, it is unclear whether the assumption of no-slip along the walls, used in the hydrodynamic model, is satisfied for the smooth, hydrophobic interior of a carbon nanotube (Zhu et al. (2002) Phys. Rev. Lett. 88:106102), and this alone may account for the discrepancy in these two values.

In summary, a robust, void-free membrane that can be used for the study of nanofluidics has been developed by standard microfabrication techniques, consisting of multiwall carbon nanotubes embedded in a silicon nitride matrix. A nonporous silicon nitride membrane was formed by the oxidative removal of these carbon nanotubes from the silicon nitride matrix. The gas permeability of this nonporous silicon nitride membrane was confirmed and the nitrogen permeance determined. Assuming Knudsen-type diffusion through the membrane, an average pore size of 66 nm is calculated, which is comparable to that of the multiwall nanotube outer diameter. The calculated rate of water transport (in the hydrodynamic limit) of 1.91 mole/m$^2$-s through a smaller pore nanotube membrane suggests that the structure would be suitable for liquid-based experiments and potential nanaofluidic devices.

Example 2

This example also describes multiwalled carbon nanotubes embedded in a silicon nitride matrix Multiwall Carbon Nanotube Growth and Membrane Fabrication Procedure The starting substrate is test grade silicon (100). A thin multilayer catalyst is then deposited by electron beam deposition, consisting of 2-5 nm iron atop a 10 nm aluminum buffer layer. After catalyst deposition, samples are placed into a thermal CVD furnace and heated up to a temperature of 850° C. at a pressure of 760 Torr in a reducing environment of argon and hydrogen (600 sccm and 400 sccm, respectively for MWCNT growth), resulting in the conversion of this thin metal layer into nanoparticles. Upon temperature stabilization, ethylene is introduced at a flow rate of 1000 sccm to initiate nanotube growth. CNTs are grown to a height of between 1-5 μm. The nanotube size distribution was characterized transmission electron microscopy (TEM) of the as-grown nanotubes. TEM measurements are performed using a Philips CM300-FEG TEM, operating at 300 kV and with an extraction voltage for the field emission gun of 4.2 keV.

The next step of the fabrication process involves coating samples with low-stress LPCVD silicon nitride (at 805° C.) to fill the gaps between the nanotubes and form the membrane structure. Excess silicon nitride at the top of the membrane and metallic nanoparticles on the back of the membrane are removed by argon ion beam etching, and the nanotube pores are opened by reactive ion etching in an oxygen containing plasma. It is not until the reactive ion etching step that the membrane begins to exhibit gas permeability.

Gas Measurement Setup

Gas selectivity measurements were performed in a high-vacuum setup using an O-ring sealed flow cell. The apparatus used is similar to that used for the characterization of nanoporous and molecular sieve membranes (see for example Acharya and Foley (2000) AIChe J. 46:911). The integrity of the O-ring seal was interrogated by performing leak rate checks using an unetched membrane that was gas impermeable. The net leakage across such a "blank" membrane was less than 1% of that through an opened, permeable membrane. Both sides of the membrane were evacuated to a pressure of <1 mTorr and then both sides were isolated from vacuum and filled with the gas of interest to a pressure of 15 psi (103 kPa), as monitored by a pressure transducer. The downstream side of the membrane was then evacuated to establish a steady gas flux across the membrane. Then, this downstream side was isolated from the vacuum, allowing the gas to diffuse across the membrane into a fixed, known volume. The pressure gradient was ensured to remain constant over the course of the experiment. The rate of pressure rise into this volume was monitored by a more sensitive downstream pressure transducer, and is proportional to the gas permeability or diffusivity (see for example Rutherford (1997), Adsorption 3:283). The flow cell was completely evacuated between experiments utilizing different gases and the helium permeability was checked to ensure that modifications in the membrane properties did not occur between experiments. For the determination of the flow rate across the membrane, a mass flow controller was placed downstream of the membrane and the value was measured directly. The values determined by this method agreed well with those calculated from the rate-of-rise measurements.

Example 3

This example describes the fabrication of vertically aligned carbon nanotube arrays having internal diameters of less than about 2 nm.

Fabrication Procedure

Figure 9:
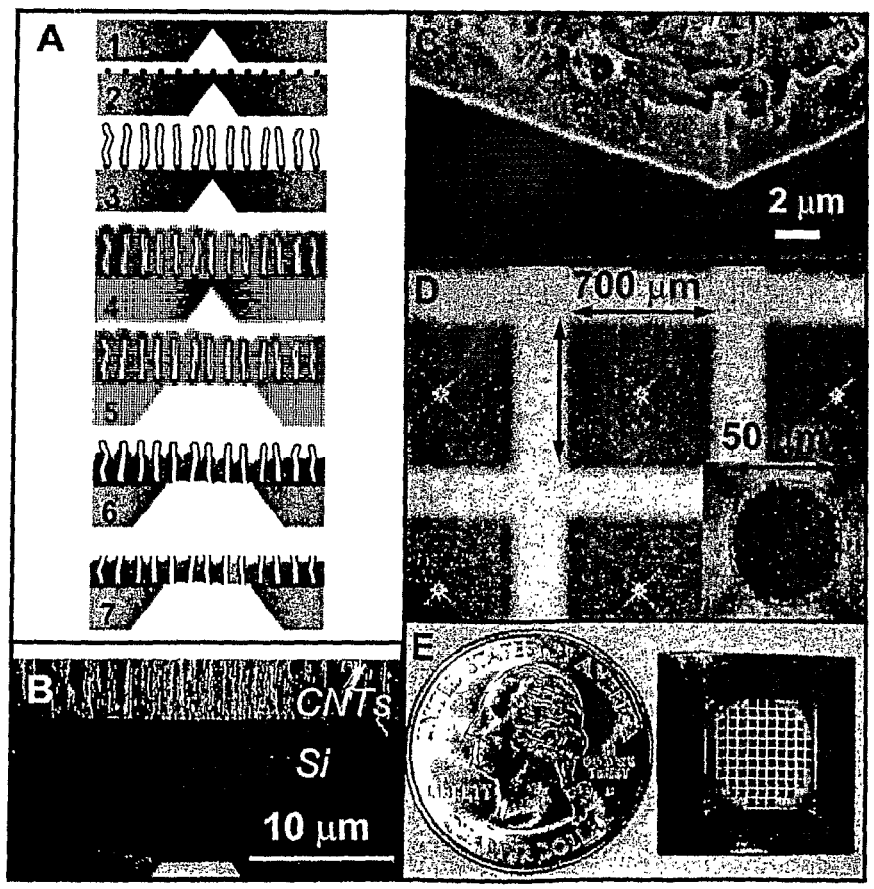
FIGS. 9A through 9D is an example of the fabrication process.
FIG. 9E is a photograph of the membrane chip that contains 89 open windows, each window is 50 μm in diameter.

The schematic of the fabrication process is given in FIG. 9A.

The starting substrate was test grade silicon (100) coated with about 250 nm of low pressure chemical vapor deposited (LPCVD), low-stress silicon nitride ($Si_3N_4$). Photolithography and reactive ion etching was used to define the device features and pre-patterning was carried out using anisotropic silicon etching in KOH. Device dimensions were 2×2 cm, each having an array of 89 pits of 700×700 micron lateral dimension, leaving approximately 50 microns of silicon remaining on the side opposite the pits. HF was used to remove the initial silicon nitride and expose silicon surface.

A thin multilayer catalyst was then deposited by electron beam deposition, comprising 10 nm aluminum, 0.3 nm molybdenum, and 0.5 nm iron (the latter two being 'nominal' values as reported by the thin film deposition monitor). This multilayer was used for double wall nanotube growth, while a different multilayer comprising 10 nm aluminum and 4 nm iron was used for multiwall nanotube growth.

Figure 10:
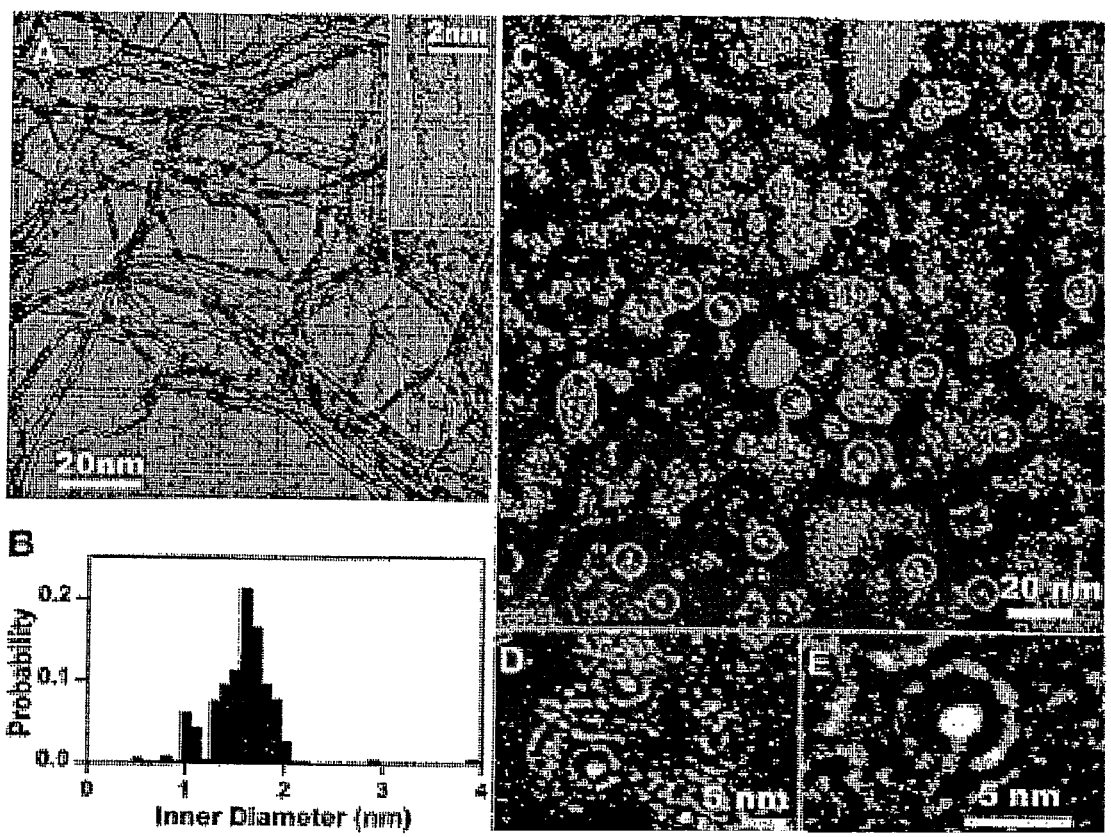
FIGS. 10 C to 10E: Plan-view TEM images of carbon nanotube membrane taken with the beam parallel to the CNT axis.
Figure 13:
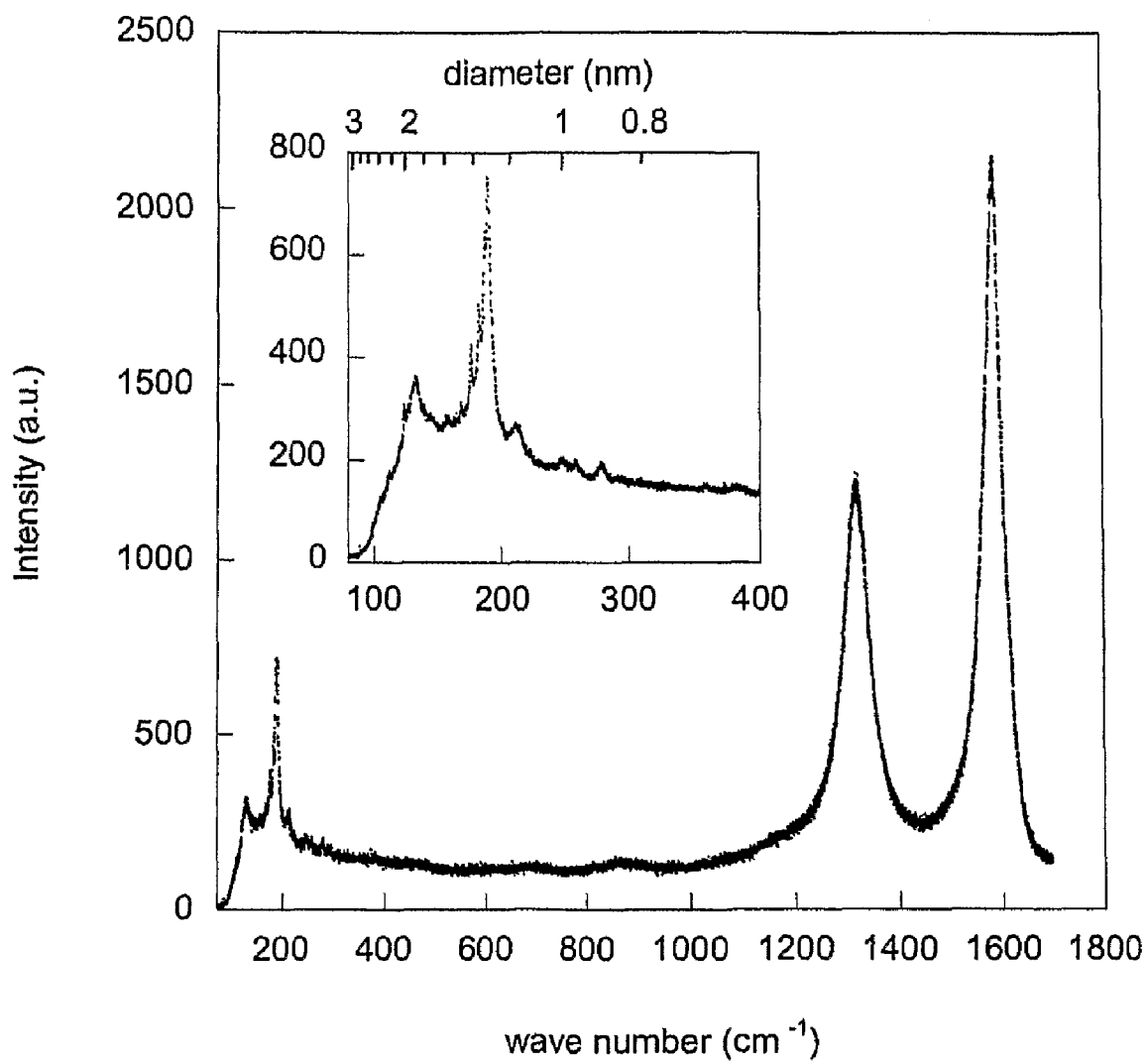
FIG. 13 shows Raman spectrum of carbon nanotubes used in membrane fabrication. The low wavenumber peaks (<300 cm$^{-1}$) are attributed to single wall carbon nanotubes, present either alone or coaxial with a larger tube (the predominant variety) in DWCNTs. The defect 'D' band at approximately 1350 cm$^{-1}$ likely originates from amorphous carbon in the sample (Osswald et al. (2005) Phys. Lett. 402, 422), while the peak at 1580 cm$^{-1}$ is the graphite 'G' band conventionally observed in carbon nanotubes.

After catalyst deposition, samples were placed into a thermal CVD furnace and heated up to a temperature of 850° C. at a pressure of 760 Torr in a reducing environment of argon and hydrogen (600 sccm and 400 sccm, respectively for DWCNT growth and 60 sccm and 40 sccm, respectively for MWCNT growth), resulting in the conversion of this thin metal layer into nanoparticles. Upon temperature stabilization, ethylene was introduced at a flow rate of 100 sccm to initiate nanotube growth. CNTs were grown to a height of between 1-5 microns. The nanotube size distribution of DWCNTs was characterized by Raman spectroscopy (632.6 nm) (FIG. 13), as well as transmission electron microscopy (TEM) of the as-grown nanotubes (FIG. 10A). TEM measurements were performed using a Philips CM300-FEG TEM, operating at 300 kV and with an extraction voltage for the field emission gun of 4.2 keV.

The next step of the fabrication process involved coating samples with low-stress LPCVD silicon nitride (at 805° C.) to fill the gaps between the nanotubes and form the membrane structure. The remaining (50 microns) of silicon beneath the membrane was then etched away by a vapor-phase $XeF_2$ process, which exposed the membrane from the back. The diameter of the exposed membrane in each of the 89 pits was approximately 50 microns, resulting in an overall exposed membrane area of $1.7 \times 10^{-3}$ cm². Excess silicon nitride at the top of the membrane and metallic nanoparticles on the back of the membrane were removed by argon ion beam etching, and the nanotube pores were opened by reactive ion etching in an oxygen containing plasma. It was not until the reactive ion etching step that the membrane began to exhibit gas permeability.

Membrane Characterization

Size-Exclusion and Water Flow Measurements

Size exclusion and water flow measurements were performed by mounting the membrane in an O-ring sealed flow cell. Approximately 2 mL of analyte was placed into the top side of the fixture through transparent plastic tubing, with the bottom side kept dry. This liquid volume was sufficient to wet the top of the membrane and fill the plastic tubing. The top side was pressurized to 12 psi (0.82 atm) and the rate of water/analyte transport was determined by monitoring the liquid level within the tubing. Liquid emerging from the bottom side of the cell was collected into a reservoir. The ruthenium trisbipyridine ion ($Ru(bpy)_3^{2+}$) concentration in water was determined by UV-Visible spectroscopy. The presence of 2 nm Au nanoparticles in the water permeate solution was detected by atomic force microscopy (AFM). Microliter-sized droplets of the solution were first placed onto a freshly-cleaved mica surface. Upon drying, the surface was analyzed with the AFM. The sensitivity for this detection method was approximately 1% of the starting solution concentration. The AFM image of the dried drop of the initial solution revealed approximately 100 particles per 1 μm² area. AFM examination of several similarly sized areas from the identical amount of permeate solution did not reveal any particles. No particles were observed both at the center of the dried permeate drop and at the edge. The water transport rate during 2 nm gold filtration through the DWCNT membrane was observed to be an order of magnitude smaller than that of pure water ($7 \times 10^{-5}$ ccm versus $7 \times 10^{-4}$ ccm), presumably due to partial blockage of the sub-2 nm carbon nanotubes. Coupled with the observation of at least a 100-fold reduction in the concentration of 2 nm particles in the permeate and the observation that these particles do pass through the larger pore MWCNT membrane, it was estimated that less than 0.1% of the water flux could be attributed to pores larger than 2 nm. Concentration of the 5 nm and 10 nm Au nanoparticles could be determined using spectroscopic methods due to the distinct visible absorption of these solutions. The sensitivity for the spectroscopic detection of these nanoparticles in solution was also approximately 1% of the starting solution concentration, limited by the detector of the UV-Visible spectrometer used. Table 2 presents a summary of the size exclusion tests performed on DWCNT and MWCNT membranes, with the molecular flux of each species indicated. The molecular flux was determined from the concentration of the emerging permeate solution multiplied by its volume, divided by membrane area and duration of the measurement.

Gas Measurements

Gas selectivity measurements were performed in a high-vacuum setup using an O-ring sealed flow cell. The apparatus used is similar to that used for the characterization of nanoporous and molecular sieve membranes (Acharya and Foley (2000) supra). The integrity of the O-ring seal was interrogated by performing leak rate checks using an unetched membrane that was gas impermeable. The net leakage across such a "blank" membrane was less than 1% of that through an opened, permeable membrane. Both sides of the membrane were evacuated to a pressure of <1 mTorr and then both sides were isolated from vacuum and filled with the gas of interest to a pressure of 15 psi (103 kPa), as monitored by a pressure transducer. The downstream side of the membrane was then evacuated to establish a steady gas flux across the membrane. Then, this downstream side was isolated from the vacuum, allowing the gas to diffuse across the membrane into a fixed, known volume. The pressure gradient was ensured to remain constant over the course of the experiment. The rate of pressure rise into this volume was monitored by a more sensitive downstream pressure transducer, and is proportional to the gas permeability or diffusivity (Rutherford, et al. (1997) Adsorption 3:283) across the membrane. The flow cell was completely evacuated between experiments utilizing different gases and the helium permeability was checked to ensure that modifications in the membrane properties did not occur between experiments. For the determination of the flow rate across the membrane, a mass flow controller was placed downstream of the membrane and the value was measured directly. The values determined by this method agreed well with those calculated from the rate-of-rise measurements.

Data Analysis

Table 3 in the main text presents the data in the flow per nanotube basis which was generated by dividing the observed flow rate by the nanotube density. To calculate flow enhancements, the ratio of the observed flow through each nanotube with the flow was computed calculated by classical equations provided in the notes. This way of presenting the data allows for direct comparison with simulations and captures the flow enhancements due to transport mechanisms different from the classical no-slip hydrodynamic flow for water or Knudsen flow for gases. The measured flow rates were reproducible on different days and the water flow rates were stable over the periods of >24 h.

Figure 12:
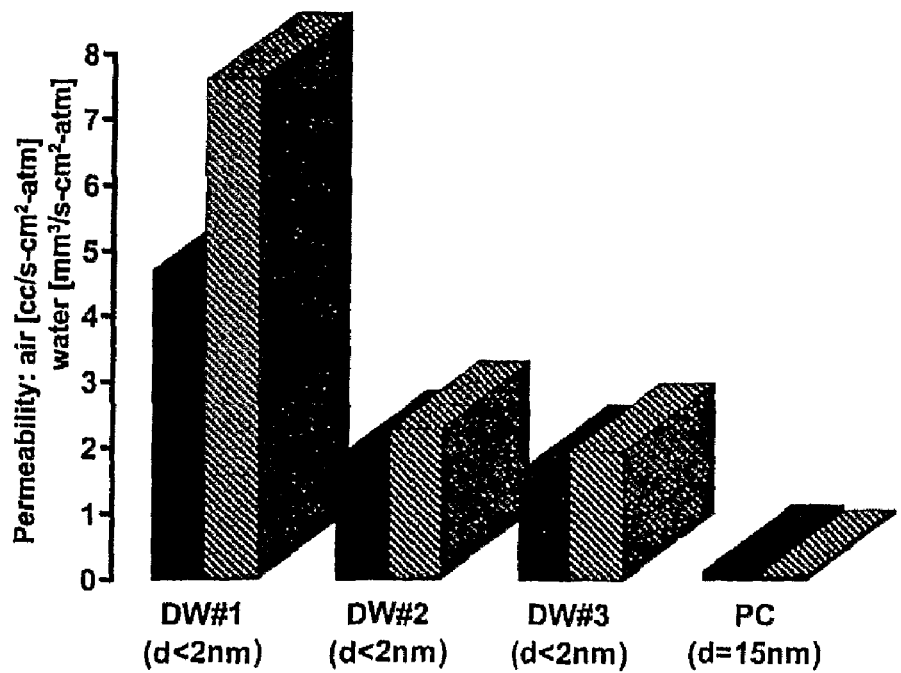
FIG. 12 illustrates air (darker; left) and water (striped; right) permeability as measured for three double wall carbon nanotube membranes (internally designated DW#1, DW#2 and DW#3), and a polycarbonate membrane (PC). Note that despite considerably smaller pore sizes, the permeabilities for all DWCNT membranes greatly exceed those of the polycarbonate membrane; specifically the air permeability is more than 10 times higher, while water permeability is more than 100 times higher.

FIG. 12 presents permeability which is the figure of merit for membrane performance. High permeability of the DWCNT membranes is a combination of high pore density and high flow rate through each individual pore. Permeability of MWCNT membrane with pores of 6.5±0.5 nm was comparable to that of DW#1 whose pore size was <2 nm (7 cc/s-cm$^2$-atm for air and 8 mm$^3$/s-cm$^2$-atm for water). Note that according to Knudsen formalism gas flow rate through an individual tube scales as the diameter to the third power, while according to Hagen-Poiseuille formalism water flow rate through an individual tube scales as the diameter to the fourth power.

Experimental Discussion

Described herein are micro-electro-mechanical systems (MEMS) compatible fabrication process (FIG. 9A) for sub-2 nm CNT pore membranes using catalytic chemical vapor deposition (CVD) growth of a dense, vertically-aligned array of DWCNTs on the surface of a silicon chip (FIG. 9B), followed by conformal encapsulation of the nanotubes by a hard, low-pressure chemical vapor deposited silicon nitride (Si$_3$N$_4$) matrix (FIG. 9C). Transmission electron microscopy (TEM) images reveal that this process produced gap-free membranes over the length scale of the whole chip. The excess silicon nitride was removed from both sides of the membrane by ion milling and the ends of the nanotubes were opened up with reactive ion etching. Significantly, the membranes remained impermeable to both liquids and gases until the very last etching step, presenting further evidence that the fabrication process produced crack-free and void-free membranes. TEM plan-view images (FIG. 10C-E) of a slice of the membrane also demonstrate that the silicon nitride coats the DWCNTs conformally and does not leave any gaps between the outer surface of the CNT and the silicon nitride. One can also use the same nitride-encapsulation method to produce MWCNT membrane. (Holt et al., Science (2006) 312:1034-1037), which is hereby incorporated by reference herein in its entirety including figures and cited supporting material.

To characterize the membrane pore size, size exclusion measurements were performed (Table 2, Holt et al. (2006) Science, supra) and these results were compared with electron microscopy. DWCNT membranes passed through species with a size of up to 1.3 nm, yet blocked 2 µm gold particles, suggesting that these membranes have pore sizes between 1.3 and 2 nm. Comparison of the water flow rates prior to and during filtration, coupled with the upper limit estimate to the flux of 2 nm gold particles suggested that less than 0.1% of the flux through the membrane can be attributed to pores larger than 2 nm. (Holt et al. (2006) Science, supra). The size exclusion measurements are further supported by the evidence obtained through electron microscopy. The distribution of DWCNT, measured by TEM, revealed an inner diameter average of 1.6 nm (FIG. 10B). TEM images (FIG. 10C) of the membrane also revealed that the only holes that permeate through the membrane are of a size that is consistent with the inner diameter distribution of as-grown DWCNTs. A MWCNT membrane, used as a reference, transported colloidal gold particles with 2 nm and 5 nm diameters, but excluded the 10 nm colloidal gold particles, in agreement with MWCNT diameters of 6.5±0.5 nm estimated by TEM. This result also suggested that pore clogging by particles smaller than the average pore size was unlikely for the solution concentrations used in these experiments. It was concluded that the transport in the samples occurred exclusively through the inner pores of the carbon nanotubes spanning the membrane.

The absolute gas flux through the membranes exceeded the flux predicted by Knudsen diffusion model. As the dimensions of the pore shrink and the mean free path ($\lambda$) becomes larger than the channel dimensions (d), the transport enters the molecular flow regime. In such situations where particle-surface collisions dominate over particle-particle collisions (R. B. Bird, W. E. Stewart, E. N. Lightfoot (1960) Tranport Phenomena Wiley, Ed. (New York), pp. 19) the Knudsen diffusion model is frequently applied. Indeed, the pore geometries are characterized by Knudsen numbers ($\lambda$/d) of 10-70, which places them well into the free-molecular transport regime. However, the flux measured through the membranes exceeded the flux predicted by the Knudsen model by at least 1-2 orders of magnitude (Table 3).

For gas flow in the Knudsen regime, the overall membrane flow rate can be determined from:

$$Q_{gas} = \frac{2}{3}\sqrt{\frac{8\pi}{MRT}}(d/2)^3 V_m \frac{\Delta p}{L}\sigma A$$

where M is molecular weight, R is the universal gas constant, T is temperature, d is pore diameter, $V_m$ is the molar volume, $\Delta p$ is the pressure drop, L is the thickness of the membrane, $\sigma$ is the areal pore density and A=89·π(25 µm)$^2$=175000 µm$^2$ is the total area of the membrane.

By comparison, a polycarbonate membrane (Nucleopore, Osmonics, Inc.) revealed just a slight enhancement in flux.

The single largest uncertainty in quantifying the flux through the membrane pores lies in determination of the active pore density (i.e. those nanotubes which are open and spanning the membrane). A pore density estimate of $2.5 \times 10^{11}$ cm$^{-2}$ was derived from the plan-view TEM images of the DWCNT membrane (FIG. 2C-E) and the enhancement factors that are reported represent lower boundary estimates. This density is only a factor of 4 smaller than the catalyst density on the substrate ($\sim 10^{12}$ cm$^{-2}$), also determined by TEM. It is worth noting that this areal density is comparable to the measured areal density of SWCNTs/DWCNTs produced using a catalyst recipe similar to that which was used (Wang, et al. (2005) J. Appl. Phys. 98:063908). The estimate from the TEM images still represents the upper bound for the density since it assumes that every DWCNT that spans the 50 nm thick section imaged in the TEM also spans the entire membrane thickness.

The observed flow enhancement is most likely caused by the intrinsic smoothness of the CNT surface, as predicted by MD simulations of gas flow through SWCNTs (see, e.g., Skoulidas et al. (2002) Phys. Rev. Lett. 89:185901; Chen and Sholl (2006) J. Memb. Sci. 269:152; Ackerman, et al. (2003) Mol. Sim. 29:677 and Chen, et al. (2006) J. of Phys. Chem. B 110:1971). In atomically smooth pores the nature of gas-wall collisions can change from purely diffuse (as in the Knudsen model), to a combination of specular and diffuse collisions, (Bhatia et al. (2005) Mol. Sim. 31:643) thus leading to observed faster transport.

Figure 11:
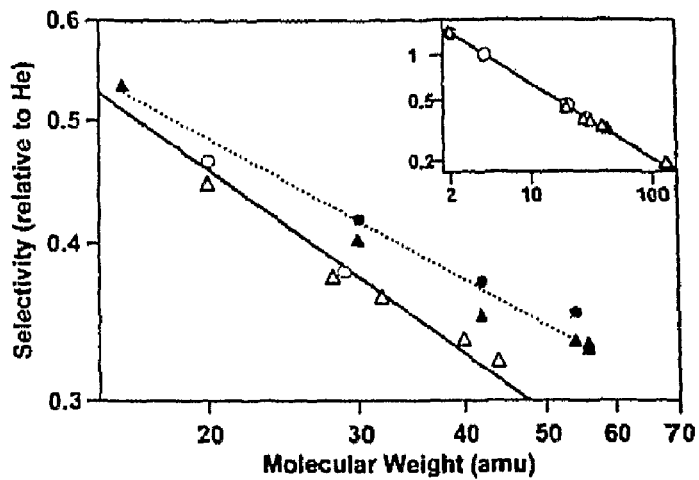
FIG. 11 illustrates gas selectivity (defined as the permeability relative to He) data for sub-2 nm DWCNT (triangles) and MWCNT (circles) membranes. Open symbols designate the non-hydrocarbon gases ($H_2$, He, Ne, $N_2$, $O_2$, Ar, $CO_2$, Xe) and filled symbols designate hydrocarbon gases ($CH_4$, $C_2H_6$, $C_3H_6$, $C_4H_6$, $C_4H_8$). The solid line is a power law fit of the non-hydrocarbon gas selectivity data, showing a scaling predicted by the Knudsen diffusion model (exponent of $-0.49 \pm 0.01$). The dashed line is a power law fit of the hydrocarbon gas data, showing a deviation from the Knudsen model (exponent of $-0.37 \pm 0.02$). The inset shows the full mass range of the non-hydrocarbon gas data, again illustrating agreement with the Knudsen model scaling.

Single-component selectivity for most of the gases exhibited the expected inverse square root scaling of molecular mass (FIG. 11, inset) with the exception of hydrocarbons whose selectivities were higher. This result is not surprising for a molecular diffusion process since it reflects the mass dependence of molecular velocity. (Note that the nature of wall collisions would not affect the mass scaling). Out of all the measured gases, only the hydrocarbons deviated from the $M^{-1/2}$ scaling, exhibiting a higher selectivity (FIG. 11) in both DWCNT and MWCNT membranes. Interestingly, a reference polycarbonate membrane with a pore size of 15 nm did not show this deviation. One can attribute the deviation to the preferential interaction of hydrocarbons with the carbon nanotube sidewalls. The hydrocarbon transport enhancement most likely occurs due to surface diffusion or possibly a solubility/diffusion mechanism (Leger et al. (1996) J. Memb. Sci. 120:187). Pulse mass analysis of various organic compounds has shown strong adsorption of hydrocarbon molecules (e.g. hexane) on SWCNTs relative to more polar molecules (e.g. ethanol) (Bittner, et al. (2003) Carbon 41:1231). It is worth noting that the hydrocarbon selectivity in these single-component experiments may be more pronounced for practical gas separation problems where mixtures are involved (Chen et al. (2006) supra).

The membranes also transported water across the carbon nanotube channels, at rates that cannot be accounted for by continuum flow models. The measured water flow rates reveal a flow enhancement (Table 3) that is more than 3 orders of magnitude faster than the no-slip, hydrodynamic flow, as calculated from the Hagen-Poiseuille equation:

$$Q_{HP} = \frac{\pi (d/2)^4}{8\mu} \frac{\Delta p}{L}$$

where $Q_{HP}$ is the volumetric flow rate, $\Delta p$ is the pressure drop, d is the pore diameter, $\mu$ is the water viscosity, and L is the membrane thickness.

Breakdown of this continuum model is not surprising for 1-2 nm sized channels. If one takes the formalism used for gases and define a mean free path in liquids as the molecular diameter (e.g. ~0.3 nm for $H_2O$), the Knudsen number for a 1-2 nm pore is 0.15-0.3. These values lie on the border between "slip flow" and "transitional flow". In this size regime where the pore is only ~7 water molecules in diameter, continuum theory concepts such as a velocity profile may be difficult to define. For this reason, MD simulations are often used for the prediction of water flows through carbon nanotube pores of order 1 nm (Hummer et al. (2001) supra and Hummer (2003) Proc. Natl. Acad. Sci. U.S.A. 100:10175). However, the computational expense of MD simulations, as well as observations of a finite fluid "slipping velocity" at hydrophobic interfaces (Baudry, et al. (2001) Langmuir 17:5232) have motivated attempts to simulate flow through SWCNTs utilizing meso- and macroscopic flow models (Kotsalis et al. (2004) Int. J. Multiph. Flow 30:995). These simulations calculated a corresponding "slip length", which describes the non-continuum behavior of a liquid near the pore walls. If one applies a similar formalism for the flow through the sub-2 nm CNT membranes, one can calculate slip lengths as large as 1400 nm (Table 3).

With the inclusion of a slip flow correction, the Hagen-Poiseuille equation becomes:

$$Q_{SLIP} = \frac{\pi \left[ (d/2)^4 + 4(d/2)^3 L_s \right]}{8\mu} \frac{\Delta p}{L}$$

where $L_s$ is defined as the slip length. The slip length is given by:

$$L_s = \frac{U_{wall}}{dU/dr}$$

where $U_{Wall}$ is the axial velocity at the wall, and dU/dr is the radial velocity gradient at the wall (or shear rate).

These values are almost three orders of magnitude larger than the pore size and are on the order of the overall size of the system (pore length). In contrast, the polycarbonate membrane with a pore size of 15 nm reveals a much smaller slip length of just 5 nm.

This comparison suggests that slip flow formalism may not be applicable to water flow through sub-2 nm carbon nanotubes, possibly due to length scale confinement (Cottin-Bizonne et al. (2002) Eur. Phys. J. E 9: 47) or to partial wetting between water and the carbon nanotube surface (Craig, et al. (2001) Phys. Rev. Let. 8705:054504).

Interestingly, the observed water flux compares well with that predicted by the MD simulations (Kalra et al. (2003) supra). The simulations predict a flux of 12 water molecules per nm$^2$ (nanotube cross sectional area) per ns; the measured flux, extrapolated to the simulation pressure drop, corresponds to 10-40 water molecules per nm$^2$ per ns. The simulation considered water transport across the carbon nanotubes driven by an osmotic pressure of about 100 atm. The experiments used pressure drops of 1 atm. Also observed is linear dependence between the applied pressure drop and the flow rate across the membranes. As an approximation, one therefore used a linear extrapolation to compare the measured flows to the simulation results. One notes two key differences between the experiments and the simulations: 1.) the simulations utilized 0.8 nm diameter CNTs, while the samples, on average, were 1.6 nm in diameter, and 2.) the pressure drops in the simulations were about 100 atm, as compared with the 1 atm pressure drop in the experiments, and it is unclear whether the linear extrapolation in flow rate versus pressure drop is valid over this range.

The MD simulations attributed the observed high water flow rates to the formation of water "wires" in the confined space inside the nanotube. The strong dependence of the structure of the water in the CNT on diameter (Koga, et al. (2001) Nature 412:802) indicates that small differences in CNT diameter can have large effects on the transport. Therefore, it is unclear if the mechanism proposed by MD is responsible for the high water flow rates observed with the larger CNTs used in the experiments, or if the flow enhancement can be attributed simply to the presence of a nearly frictionless surface.

Membrane permeability provides a figure of merit for membrane performance for practical applications. Despite having an order of magnitude smaller pore size, the enhanced flow rate per pore and the higher pore density makes the sub-2 nm membranes superior in both air and water permeability relative to conventional polycarbonate membranes (FIG. 12). Permeability is defined as the volumetric flux, normalized by the pressure drop.

TABLE 2

Size exclusion tests on double wall and multiwall carbon nanotube membranes, with the molecular flux (per unit membrane area) of a given analyte listed. Values denoted by "<" were derived from the limits of detection for the concentration measurements when Au particles in the permeate solution were not observed. Differences of 3-4 orders of magnitude between this limiting value and the flux of the next smallest species indicate that the given analyte did not pass through the membrane.

| Analyte | Analyte size (nm) | DWCNT membrane(s) Flux [molecules/cm$^2$/s] | MWCNT membrane Flux [molecules/cm$^2$/s] |
|---|---|---|---|
| Ru$^{2+}$(bipyr)$_3$ | 1.3 | $5 \times 10^{13}$ | $5 \times 10^{13}$ |
| Colloidal Au 1 | 2 ± 0.4 | $<2 \times 10^9$ | $1 \times 10^{11}$ |
| Colloidal Au 2 | 5 ± 0.75 | $<3 \times 10^8$ | $3 \times 10^{10}$ |
| Colloidal Au 3 | 10 ± 1 | n/a | $<4 \times 10^7$ |

TABLE 3

Comparison of experimental air flow rates observed for several DWCNT membranes with Knudsen model predictions, and experimental water flow rates with continuum flow model predictions. The differences between the three DWCNT membranes most likely arise due to a different number of pores opened in the fabrication process. Values for a polycarbonate membrane are provided as a reference.

| membrane | pore diameter* (nm) | pore density† (cm$^{-2}$) | thickness (μm) | enhancement over Knudsen model‡ (minimum) | enhancement over no-slip, hydrodynamic flow§ (minimum) | calculated minimum slip length‖ (nm) |
|---|---|---|---|---|---|---|
| DW #1 | 1.3-2.0 | ≦$0.25 \times 10^{12}$ | 2.0 | 40-120 | 1500-8400 | 380-1400 |
| DW #2 | 1.3-2.0 | ≦$0.25 \times 10^{12}$ | 3.0 | 20-80 | 680-3800 | 170-600 |
| DW #3 | 1.3-2.0 | ≦$0.25 \times 10^{12}$ | 2.8 | 16-60 | 560-3100 | 140-500 |
| PC | 15 | $6 \times 10^8$ | 6.0 | 2.1 | 3.7 | 5.1 |

*as determined by size exclusion measurements, TEM measurements, and manufacturer specifications (PC)
†upper limit, as determined from TEM measurements and manufacturer specifications (PC)
‡J. K. Robertson, Ph.D. thesis, University of Michigan, 1996, and J. K. Robertson and K. D. Wise, Proc. IEEE Micro Electro Mechanical Systems 7 (1994).
§See Hagen-Poiseuille equation, supra.
‖Holt et al (2006), Science, supra.

Example 4

This example demonstrates that the carbon nanotubes will separate analytes in liquid and are therefore useful for the purification of water, e.g., desalination of sea water.

The membrane internally designated as DW #3 was used for a sodium chloride (NaCl) ionic solution filtration test. RIE was carried out for 1 min on both sides of the membrane to facilitate hole opening. Having verified that the membrane showed enough air permeability, the membrane was loaded in 10 mM pure sodium chloride (NaCl) solution. The membrane with its upstream being filled with about 2 mL, 10 mM NaCl solution was pressurized by a nitrogen line under about 15 psi. After 30 hours of running, an amount of extract was verified and pipetted and some amount of extract was pipetted out for use in capillary electrophoresis (CE) experiment. CE measurement showed chloride ion concentration (Cl$^-$) reduction by 45 mole percent and sodium ion (Na$^+$) reduction by 6 mole percent. The other two double-walled membranes produced essentially the same ion rejection characteristics when tested in the same manner.

Throughout this disclosure, various publications, patents and published patent specifications are referenced by an identifying citation. The disclosures of these publications, patents and published patent specifications are hereby incorporated by reference into the present disclosure to more fully describe the state of the art to which this invention pertains.

It is to be understood that while the invention has been described in conjunction with the above embodiments, that the foregoing description and examples are intended to illustrate and not limit the scope of the invention. Other aspects, advantages and modifications within the scope of the invention will be apparent to those skilled in the art to which the invention pertains.

What is claimed is:

1. A membrane for enhanced fluid transport comprising: a vertically-aligned array of carbon nanotubes, wherein the nanotubes have average pore size of about 2 nm or less, a matrix material disposed between the carbon nanotubes and wherein the matrix material has negligible molecular permeability.

2. The membrane according to claim 1, wherein the nanotubes have open ends on each side of the membrane.

3. The membrane according to claim 1, wherein the matrix material is free of gaps between the outer surface of the nanotube and the matrix material.

4. The membrane according to claim 1, wherein the membrane provides enhanced gas transport compared to the Knudsen transport prediction for same sized pores.

5. The membrane according to claim 1, wherein the membrane provides enhancement of water flow over no-slip, hydrodynamic flow prediction.

6. The membrane according to claim 1, wherein the membrane provides an air permeability of at least one $cc/s\text{-}cm^2\text{-}atm$ and a water permeability of at least one $mm^3/s\text{-}cm^2\text{-}atm$.

7. A method of separating an analyte from a liquid by passing the liquid containing the analyte through the membrane of claim 1.

8. The method of claim 7, wherein the liquid is sea water.

9. The method of claim 7, wherein the liquid is blood or plasma.

10. A method of separating an analyte in a gas comprising passing the gas containing the analyte through the membrane of claim 1.

11. A fabric comprising the membrane according to membrane of claim 1 and a porous, polymeric or fibrous supporting material.

12. A method of making a membrane for enhanced fluid transport comprising: providing a vertically-aligned array of carbon nanotubes, wherein the nanotubes have average pore size of about 2 nm or less, disposing a conformal matrix material between the nanotubes to immobilize the nanotubes upon hardening of the conformal matrix and wherein the matrix material has negligible molecular permeability between the carbon nanotubes, and opening the nanotubes.

13. The method according to claim 12, wherein the conformal matrix material is disposed to encapsulate the carbon nanotubes and removing the excess matrix material prior to opening the nanotubes.

* * * * *